United States Patent [19]

Ito

[11] Patent Number: 4,917,482

[45] Date of Patent: Apr. 17, 1990

[54] COMPACT ZOOM LENS SYSTEM CAPABLE OF HIGH ZOOM RATIO AND HAVING COVERAGE OF A WIDE VISUAL FIELD

[75] Inventor: Takayuki Ito, Tokyo, Japan

[73] Assignee: Asahi Kogaku Kogyo Kabushiki Kaisha, Tokyo, Japan

[21] Appl. No.: 291,828

[22] Filed: Dec. 29, 1988

[30] Foreign Application Priority Data

Dec. 29, 1987 [JP] Japan ................................. 62-336460
May 27, 1988 [JP] Japan ................................. 63-129532

[51] Int. Cl.$^4$ .............................................. G02B 15/00
[52] U.S. Cl. ..................................... 350/423; 350/428
[58] Field of Search ........................ 350/423, 427, 428

[56] References Cited

U.S. PATENT DOCUMENTS

| | | | |
|---|---|---|---|
| 4,494,828 | 1/1985 | Masumoto et al. | 350/423 |
| 4,696,553 | 9/1987 | Tsuji et al. | 350/423 |
| 4,749,265 | 6/1988 | Hattori et al. | 350/427 |

FOREIGN PATENT DOCUMENTS

| | | |
|---|---|---|
| 42361 | 4/1974 | Japan . |
| 3354 | 1/1975 | Japan . |
| 63634 | 6/1976 | Japan . |
| 44039 | 4/1978 | Japan . |
| 30855 | 3/1979 | Japan . |
| 139724 | 10/1979 | Japan . |
| 62419 | 5/1980 | Japan . |
| 156912 | 12/1980 | Japan . |
| 48607 | 5/1981 | Japan . |
| 161824 | 10/1982 | Japan . |
| 164709 | 10/1982 | Japan . |
| 169716 | 10/1982 | Japan . |
| 192917 | 11/1982 | Japan . |
| 17411 | 2/1984 | Japan . |
| 37518 | 3/1984 | Japan . |
| 14212 | 1/1985 | Japan . |
| 178421 | 9/1985 | Japan . |
| 62012 | 3/1986 | Japan . |
| 140911 | 6/1986 | Japan . |

*Primary Examiner*—P. M. Dzierzynski
*Attorney, Agent, or Firm*—Sughrue, Mion, Zinn, Macpeak & Seas

[57] ABSTRACT

A compact zoom lens system is capable of high zoom ratio and has coverage of a wide visual field. The system consists, in order from the object side, of a first lens group haivng a positive focal length, a second lens group having a negative focal length and a third lens group having a positive focal length, and effects zooming from the wide-angle end to the telephoto end by moving either all of the three lens groups or the first and third lens groups, with the image plane held at a constant position, the third lens group is composed of a lens unit 3a having a positive focal length and a lens unit 3b having a negative focal length, and the two lens units 3a and 3b are moved independently of each other in such a way that the distance between the lens units 3a and 3b is increased to satisfy condition (1) when zooming is effected from the wide-angle end to the middle focal length.

11 Claims, 22 Drawing Sheets

FIG. 5a
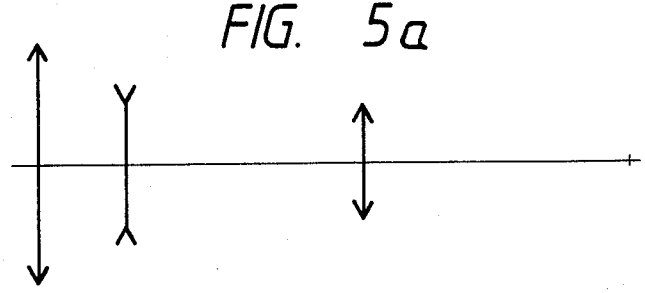

FIG. 6a
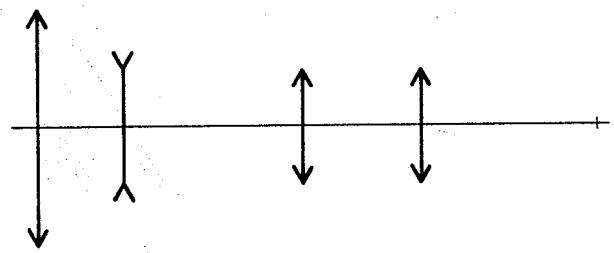
FIG. 6b
FIG. 6c
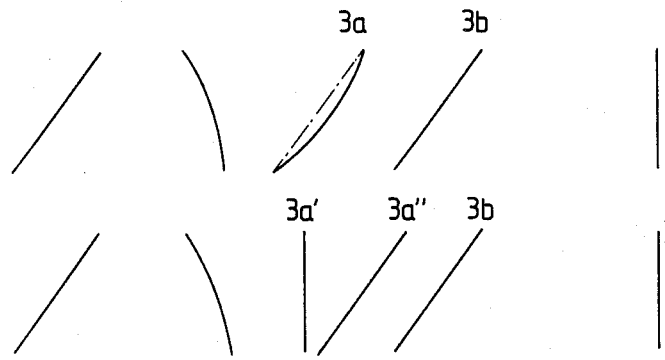

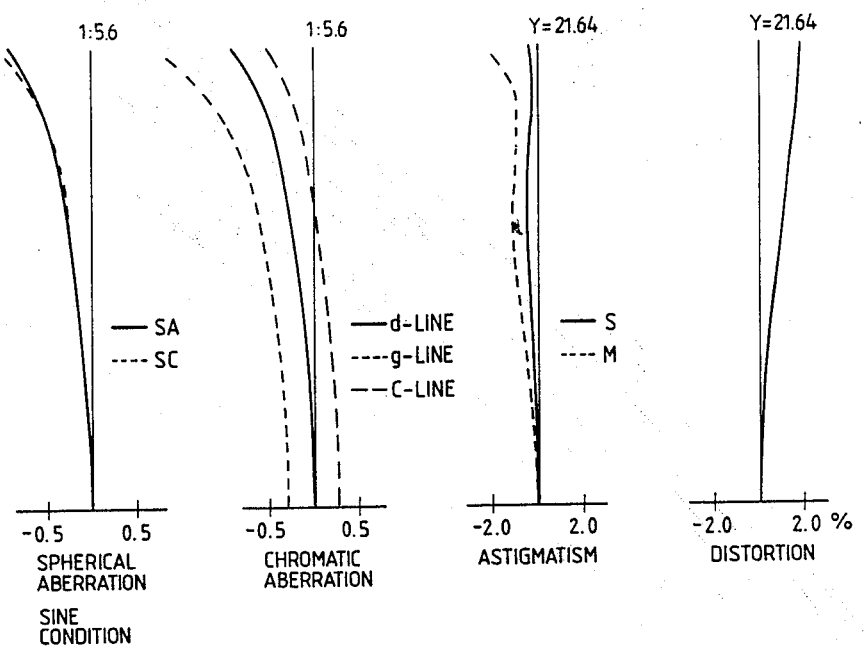
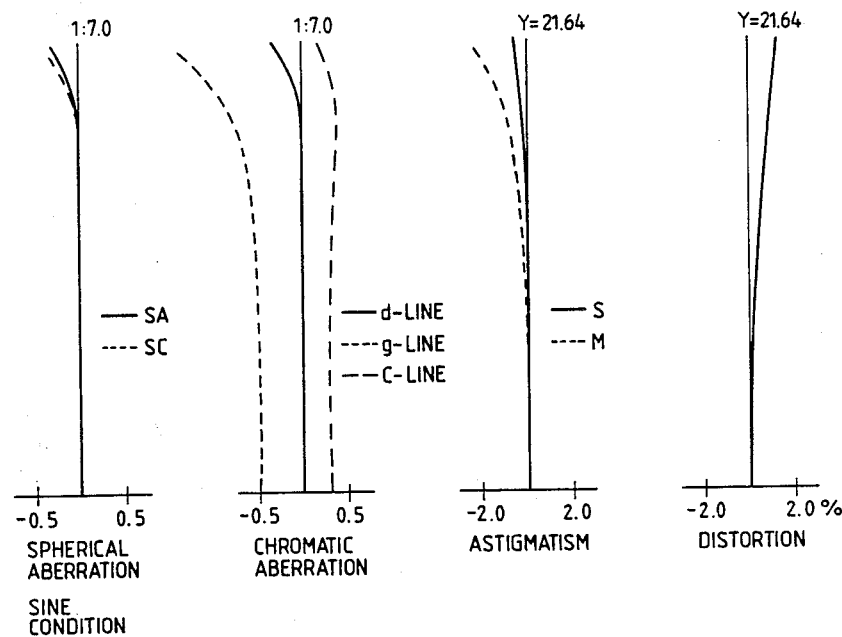

COMPACT ZOOM LENS SYSTEM CAPABLE OF HIGH ZOOM RATIO AND HAVING COVERAGE OF A WIDE VISUAL FIELD

BACKGROUND OF THE INVENTION

The present invention relates to a zoom lens system for use in a photographic camera. More particularly, the present invention relates to a zoom lens system that is compact, has coverage varying from a wide angle end to a telephoto end and which yet achieves a high zoom ratio of from about 3 to 4. Also, the present invention relates to a macro-mode zoom lens.

A zoom lens system that has a zoom ratio of at least about 3 and which has coverage varying to a narrow-angle telephoto end cannot be effectively composed of a retrofocus type consisting of a negative first lens group and a positive second lens group (this is generally referred to as the "two-group" type) or a modified type wherein the second lens group is further divided into a positive, a negative and a positive lens unit. The reason for this inability is that the diameter of the second lens group and the amount by which it has to be moved are increased considerably.

Therefore, various other zooming methods have been proposed in published patent literature for constructing zoom lens systems of the class described above, and they include:

(1) an old "four-group" type which as shown in accompanying FIG. 2, consists of a positive focusing section (first lens group) that remains fixed during zooming, a negative and movable variator section (second lens group), a negative or positive compensator section (third lens group) and a positive fixed relay lens section (fourth lens group);

(2) a modification of the first type in which the first and fourth lens groups conventionally fixed are rendered movable and which therefore consists of a positive first lens group, a negative second lens group, a positive third lens group and a positive fourth lens group, all being movable (in some versions, the second lens group is fixed);

(3) a modification, not of the first type, but rather of the fourth type to be described just below, which includes a negative fourth lens group behind the a three-group type system in such a way that it is fixed or adapted to be movable to cause a monotonic increase (sometimes monotonic decrease) in the distance between the third and fourth lens groups (see FIG. 4);

(4) a system in which all of the three lens groups, i.e., a positive first lens group, a negative second lens group and a positive third lens group, are adapted to be movable (see FIG. 5);

(5) a modification of the fourth type in which the third lens group is composed of a positive lens unit 3a and another positive lens unit 3b, which are slightly adjustable in their distance (see FIG. 6(a), or which is further modified in such a way that lens unit 3a is composed of a single-element positive fixed lens component 3a' and a positive lens component 3a'' [see FIG. 6(b)]; and (6) a system which, as shown in FIGS. 7(a) and (b), is composed of a positive first lens group, a negative second lens group, a positive third lens group, a negative fourth lens group and a positive fifth lens group, all of these five lens groups being adapted to be movable (in some versions, either the second or fifth lens groups or both are fixed).

However, these systems have their own problems as described below.

Problems of the First Type

This type which is described in JP-A No. 51-63634 (the term "JP-A" as used herein means an "unexamined published Japanese patent application") and JP-A No. 56-4860 is subject to the condition that the overall length of the system should not be changed, so in order to assure brightness of the edge of image field in focusing an object at near distance on the wide-angle side, the diameter of the front element must be increased considerably. In order to avoid their problem, it has been proposed in JP-A No. 56-48607 that the diameter of the front element to reduced by providing a diaphragm stop in the compensator section rather than the relay lens section. However, this effort to reduce the overall size of the system is inevitably limited by the condition for "fixed overall length".

Problems of the Second Type

This type successfully solves the size problem of the first type by adapting the first and fourth lens groups to be movable, and this is effective in reducing not only the overall length of the lens system at the wide-angle end but also the diameter of the front element. The number of versions of this second type that have been published in patent literature is the greatest of all zoom lens systems in the high zoom-ratio class contemplated by the present invention, and they are described in, for example, JP-A No. 51-63634, JP-A No. 53-44039, JP-A No. 55-62419, JP-A No. 57-16824, JP-A No. 57-169716 and JP-A No. 61-62012. A major problem with this type of zoom lens system is that it will experience substantial deterioration in performance if poor workmanship is involved in the manufacture of movable lens groups, in particular, if relative tilting occurs avoid this problem, close tolerances are required in production on a commercial scale.

Problem of the Third Type

This type which is described in JP-A No. 60-14212, 60-178421 and 61-140911 has the advantage that it is less prone to deterioration in performance than the second type even if relative tilting occurs between the third and fourth lens groups. However, in a conventional version in which all four lens groups are adapted to be movable and in which the fourth lens group is negative, the aberrations that have been produced in the first to third lens groups have a tendency to be increased by the fourth lens group and this causes substantial variations in coma and astigmatism during zooming. A variation, less substantial though, also seems to occur in distortion.

Among the three patents listed above, JP-A No. 60-14212 shows various versions of the third type, one of which has a coverage of a wide-angle end, another being a zoom lens system for exclusive use at a telephoto and, and still another employing a negative or positive fourth lens group. The relationship between the third and fourth lens groups is versatile; their spacing either increases or decreases monotonically during zooming from the wide-angle end to the telephoto end, or a maximum spacing is attained at middle focal length.

Examples 3 and 5 of JP-A No. 60-14212 are concerned with a system that has a coverage of a wide-angle end and which employs a negative fourth lens group. In this system, the spacing between the third and fourth lens groups decreases substantially monotonically, so the lens groups (in particular, the fourth lens group) have to be moved by a substantial amount. Example 2 of that patent shows a system in which the spacing between the third and fourth lens groups attains a maximum at middle focal length, which is similar to the movement of lens units 3a and 3b in the zoom lens system of the present invention. However, the system shown in Example 2 is for exclusive use at telephoto end and the spacing between the third and fourth lens groups in smaller at the telephoto end than at either the wide-angle end or at middle focal length. Therefore, the fourth lens group has to be moved by a great amount. In addition, the profile of lens movement from the middle focal length to the telephoto end draws such a steep curve that difficulty is involved in manufacturing a cam mechanism for the lens barrel.

Problems of the Fourth Type

This type of zoom lens system as described in JP-A No. 54-30855 and 55-156912 is merely of a three-group composition or one which disposes a fixed positive auxiliary lens either between the second and third lens groups or behind the third lens group. Whichever design is adopted, the overall length of the lens system and the diameter of the front element are unacceptably great.

Problems of the Fifth Type

This type is an improvement of the fourth type and is described in JP-A No. 59-37518 which corresponds to U.S. Pat. No. 4,576,443. The third lens group in this system is composed of a positive lens unit 3a that consists of a positive, a negative and a positive lens element and which is positioned in front of a positive lens unit 3b that consists of a positive, a negative and a positive lens element. By adopting this arrangement, the overall length of the lens system and the diameter of the front element could be made smaller than in the fourth type. However, this achievement falls short of satisfying the condition for compactness required of the latest versions of zoom lens system.

JP-A No. 59-37518 also shows a system in which lens unit 3a is further divided into a lens component 3a' and another lens component 3a", the former component 3a' being fixed. This system is no more compact than the one described above.

The zoom lens system just described above has the same power distribution among lens groups as the second type of zoom lens system, but as compared with the second type, this system is less prone to deterioration in performance that may be caused by poor workmanship in lens manufacture because lens unit 3a' is merely composed of a single small-power auxiliary lens element where as the third lens group in the second type is not.

Problems with the Sixth Type

This type of zoom lens system was proposed quite recently in JP-A No. 57-164709 and 57-192917. Being composed of five lens groups, this complex type would be advantageous for attaining a zoom ration of 5 and more but a four-group type lens system would suffice for achieving a zoom ration of 3-4.

SUMMARY OF THE INVENTION

An object, therefore, of the present invention is to provide a zoom lens system that has coverage ranging from a wide-angle end to a telephoto end and which is capable of attaining a zoom ratio of from about 3 to 4. This lens system is more compact and less prone to deterioration in performance than prior art versions in spite of poor workmanship that might be involved in lens manufacture and yet it assures good performance.

The zoom lens system of the present invention has the same arrangement of lens groups as the conventional third type of lens system at the wide-angle end but it adopts a unique method of lens movement during zooming. Stated more specifically, this zoom lens system is basically of a three-group type in which the third lens group is divided into a positive lens unit 3a and a negative lens unit 3b and these lens units are adapted to move independently of each other. By adopting this unique method of lens movement, the zoom lens system of the present invention succeeds not only in minimizing aberrational variations over the full zoom range but also in achieving compactness of overall system. The composition of this lens system is described hereinafter in detail.

The zoom lens system of the present invention has coverage of a wide visual field, is compact and attains a high zoom ration. It consists, in order from the object side, of a first lens group having a positive focal length, a second lens group having a negative focal length and a third lens group having a positive focal length, and effect zooming from the wide-angle end to the telephoto end by moving either all of the three lens groups or the first and third lens groups, with the image plane held at a constant position.

The third lens group of this zoom lens system is composed of a lens unit 3a having a positive focal length and a lens unit 3b having a negative focal length. The two lens units 3a and 3b are moved independently of each other in such a way that the distance between the lens units 3a and 3b is increased to satisfy the following condition (1) when zooming is effected from the wide-angle end to the middle focal length, and is decrease to satisfy the following condition (2) when zooming is effected from the middle focal length to the telephoto end (see FIG. 1):

(1) $0.05 < (D_M - D_T)/(f_t - f_M) < 0.6$ $((D_M - D_T > 0)$ (2) $0.35 < (D_M - D_W)/(D_M - D_T) < 5.0$ $((D_M - D_T, D_M - D_W > 0)$ where
- $D_m$: the distance between lens units 3a and 3b at the middle focal length which corresponds to $K = 0.6-0.9$ of the range of focal lengths;
- $D_T$: the distance between lens units 3a and 3b at the telephoto end;
- $f_T$: the focal length of the overall system at the telephoto end;
- $D_W$: the distance between lens units 3a and 3b at the wide-angle end;
- $K$: $(\log f_M - \log f_W)/(\log f_T - \log f_W) = \log Z_M/\log Z$;
- $f_w$: the focal length of the overall system at the wide-angle end;
- $Z_M = f_M/f_W$: zoom ratio for the middle focal length ($K = 0.6-0.9$); and
- $Z = f_T/f_W$: zoom ratio.

In a preferred embodiment, the lens unit 3b is composed of at lease one negative lens element and at least one positive lens element, and satisfies the following condition:

(3) $0.05 < f_W/|F_{3b}| < 0.6$ ($f_{3b} < 0$)

where $f_{3b}$: the focal length of lens unit 3b.

In another preferred embodiment, the negative lens element in lens unit 3b satisfies the following condition:

(4) $1.7 < N_{3bn}$ where $N_{3bn}$ is the average refractive index of said negative lens element at the d-line. In still another preferred embodiment, the power distribution among the first lens group, the second lens group and lens unit 3a in the third lens group satisfies the following conditions:

(5) $0.35 < f_W/f_1 < 0.85$
(6) $-1.5 < f_W/f_{1-2} < -0.9$
(7) $1.05 < f_w/f_{1-3a} < 1.7$ where
- $f_1$: the focal length of the first lens group;
- $f_{1-2}$: the composite focal length of the first and second lens groups at the wide-angle end; and
- $f_{1-3a}$: the composite focal length of the first lens group, the second lens group and lens unit 3a in the third lens group at the wide-angle end.

In another preferred embodiment, the second lens group is fixed with respect to the image plane. In still another preferred embodiment, the second lens group is composed of at least two negative lens elements and at least one positive lens element and satisfies the following condition:

(8) $1.7 < N_{2n}$ where $N_{2n}$: the average refractive index at the d-line of the negative lens elements in the second lens group.

BRIEF DESCRIPTION OF THE DRAWINGS

FIGS. 2a–2b, 3a–3b, 4a–4b, 5a–5b, 6a–6c and 7a–7c show the layouts of lens groups in six types of prior art zoom lens systems, as well as the curves drawn by the profile of lens movement in respective systems;

FIG. 26 is a graph plotting the aberration curves obtained when the master lens is moved as specified in Comparative Example 2 (Case 5); and FIG. 27 is a graph plotting the aberration curves obtained when the master lens is moved as specified in Comparative Example 3 (Case 6).

DETAILED DESCRIPTION OF THE INVENTION

The prior art three-group type zoom lens system has the disadvantage that if the third lens group is moved (en masse), large variations will occur in aberrations, particularly astigmatism and curvature of field, during zooming, thereby causing difficulty in compensation for aberrations and making it impossible to realize a compact system. In contrast, the third lens group in the zoom lens system of the present invention is divided into two lens units, which are adapted to be movable in a certain way, and this is effective not only in minimizing deterioration in performance in spite of poor workmanship that might be involved in lens manufacture but also in producing a zoom lens system that is compact and which yet achieves efficient compensation for aberrations.

Figure 9A:
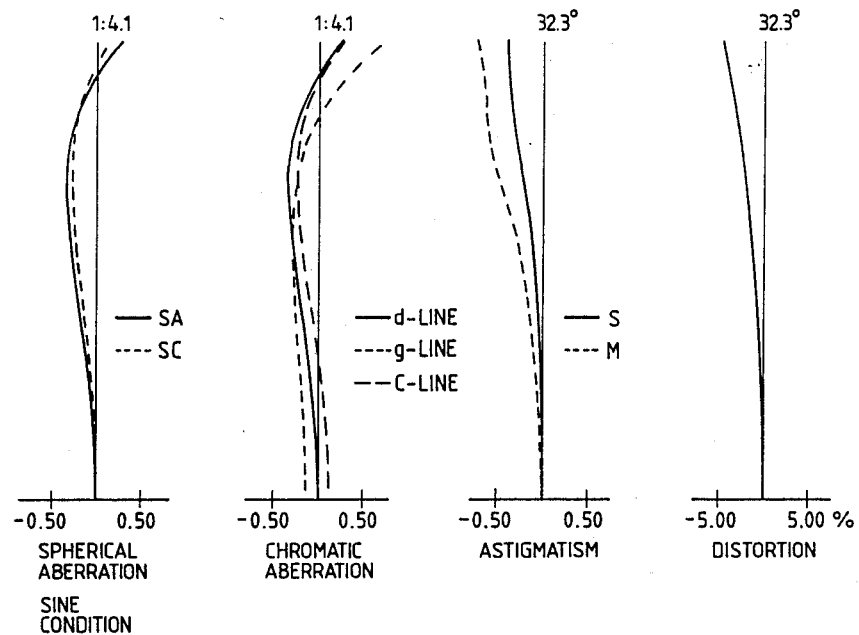
FIGS. 9, 11, 13, 15 and 17 are graphs plotting the aberration curves obtained with the zoom lens systems of Examples 1, 2, 3, 4 and 5, respectively with (a) referring to the case for the wide-angle end, (b) and (c) referring to the case for the middle focal length, and (d) referring to the case for the telephoto end.
Figure 9B:
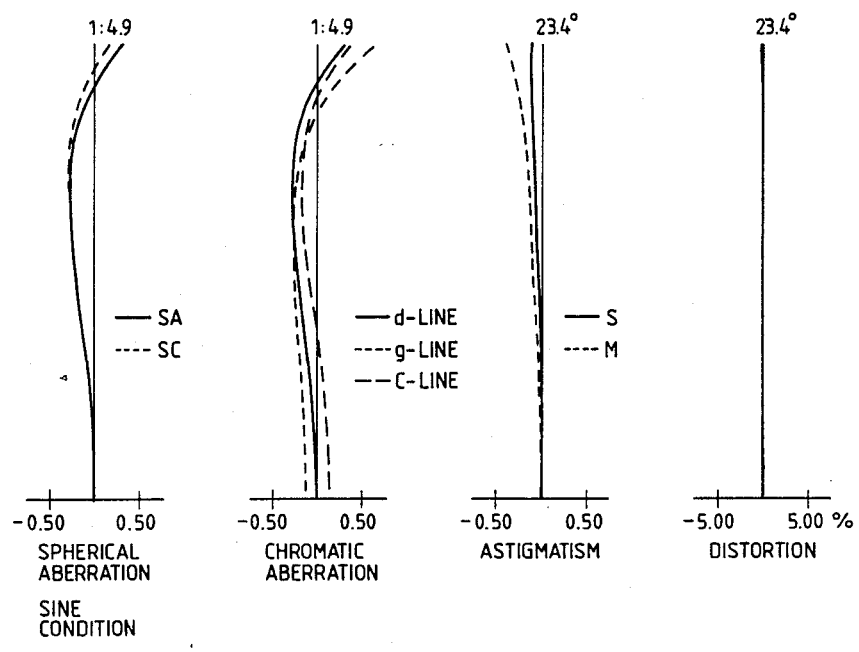
Figure 9C:
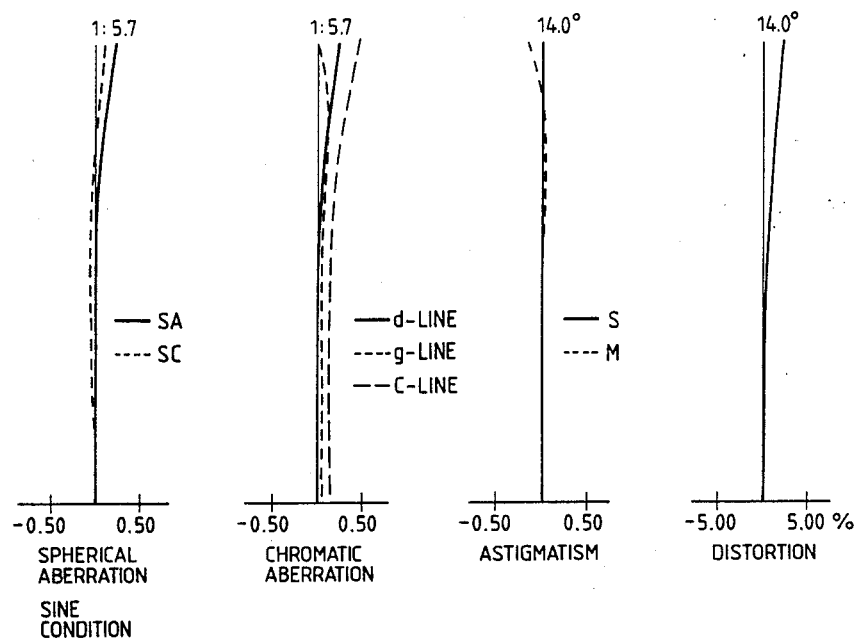
Figure 9D:
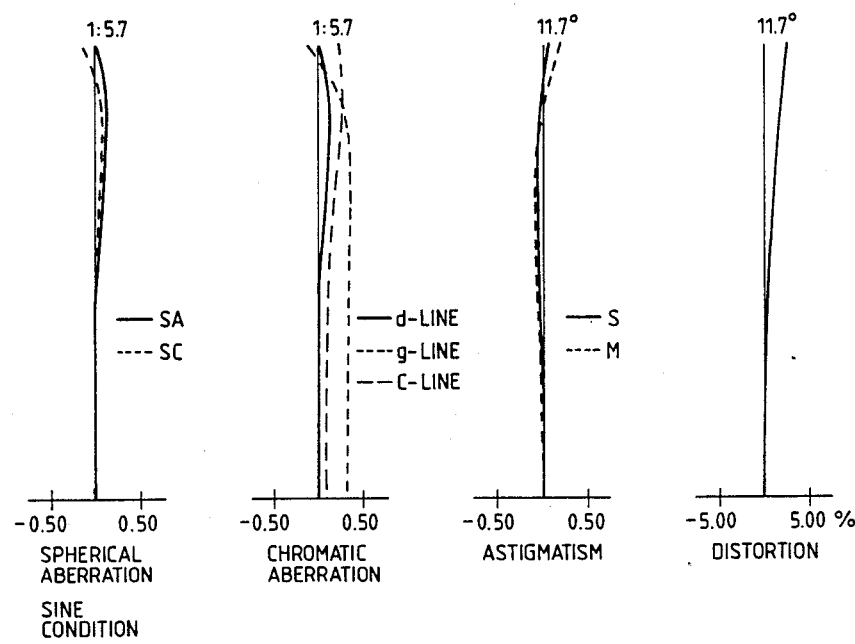
Figure 10:
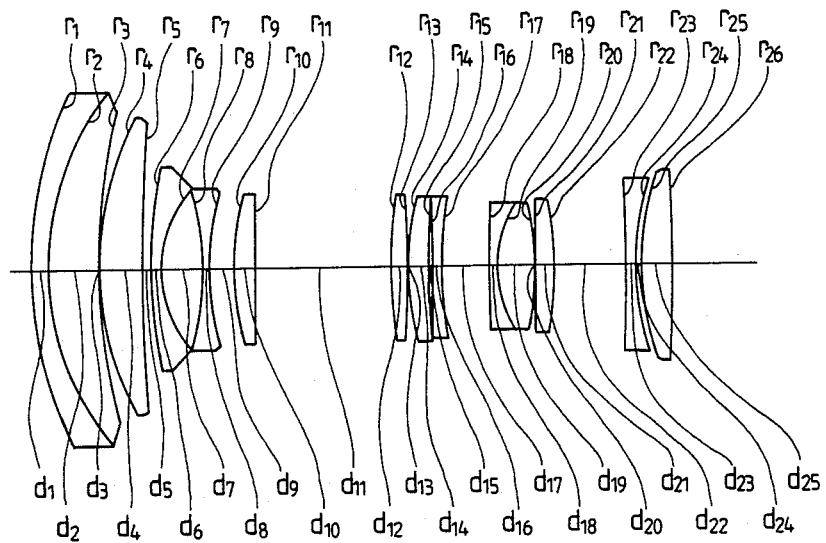
Figure 12:
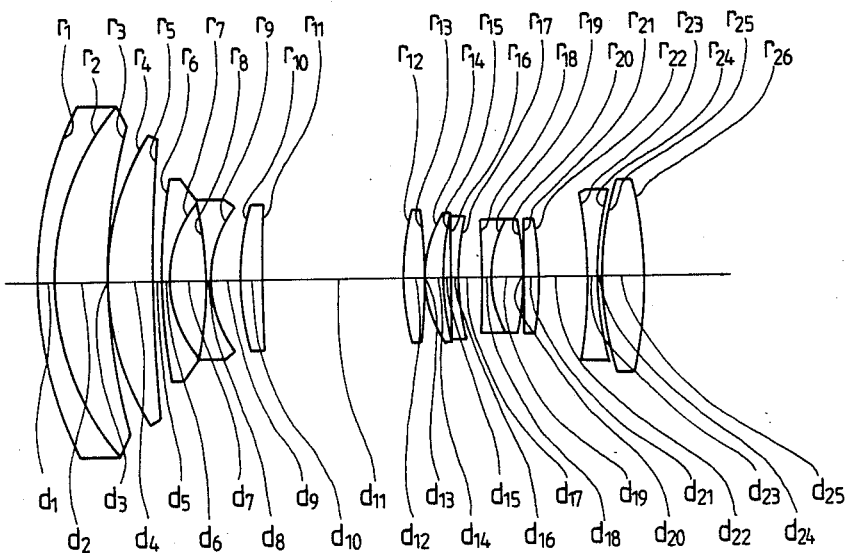
Figure 11A:
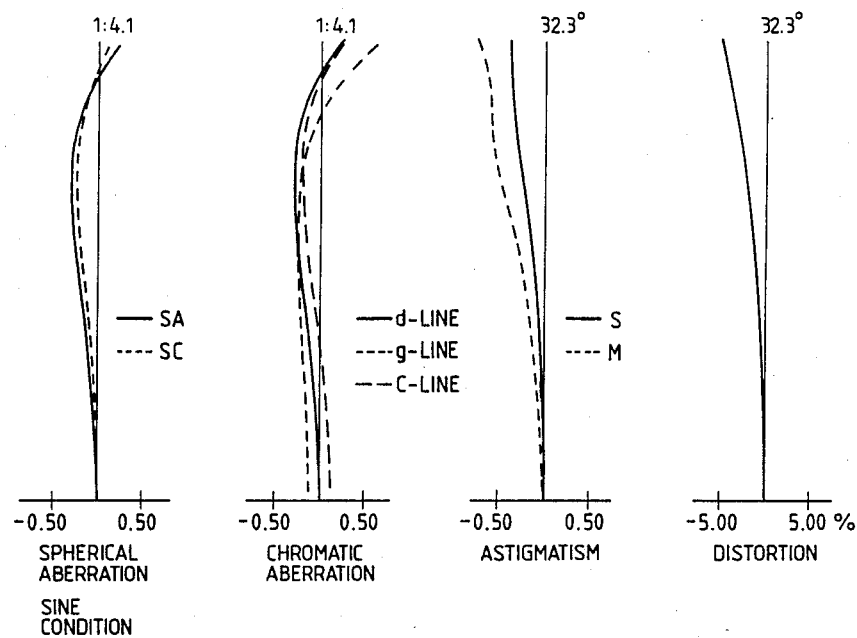
Figure 11B:
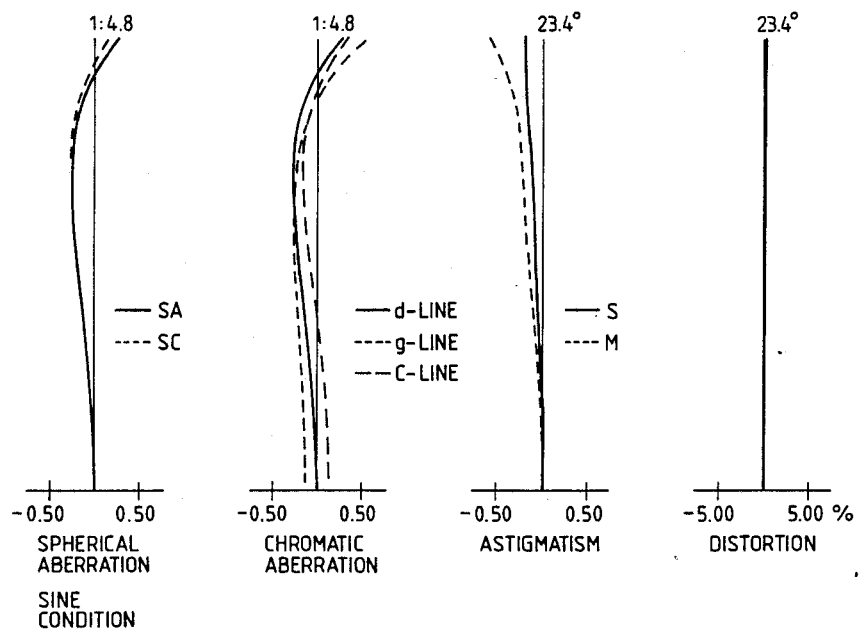
Figure 11C:
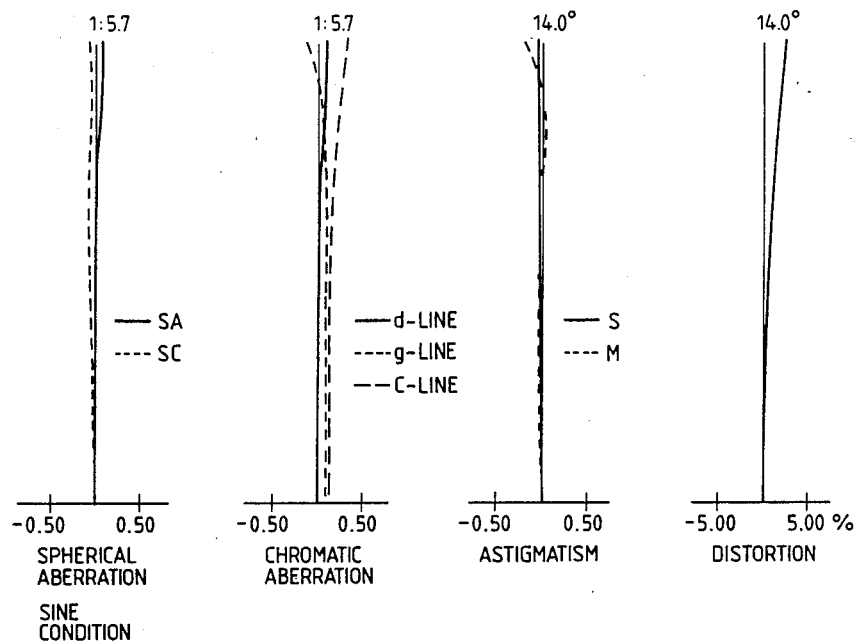
Figure 11D:
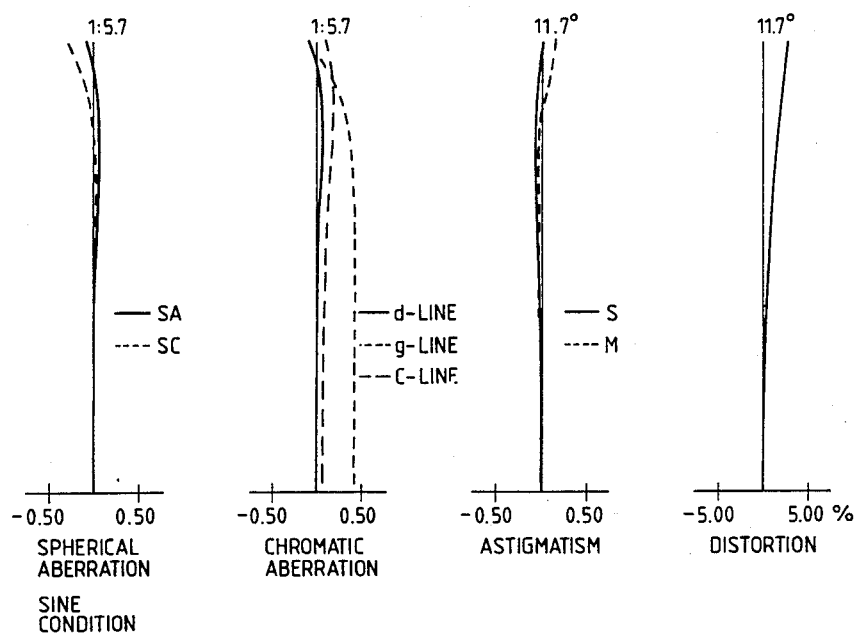
Figure 13A:
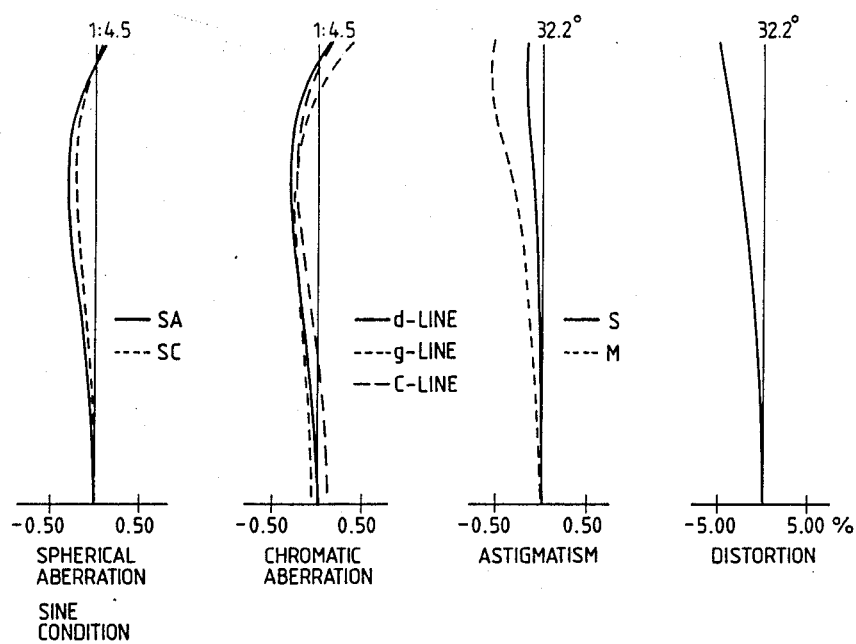
Figure 13B:
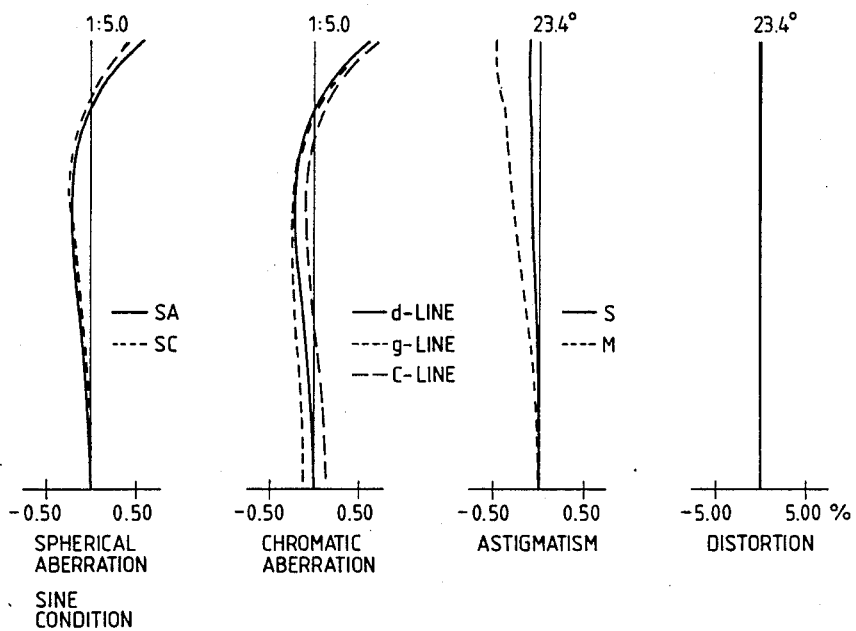
Figure 13C:
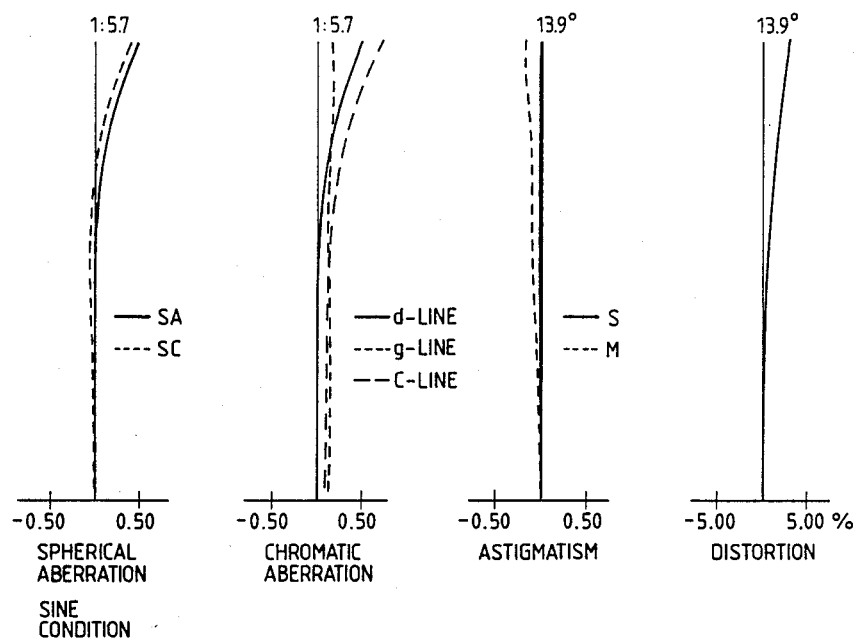
Figure 13D:
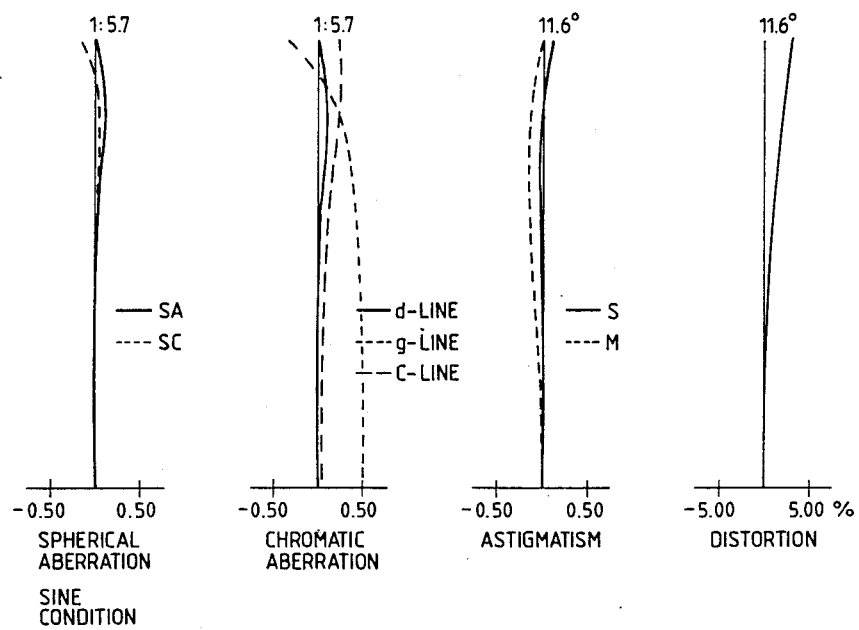
Figure 14:
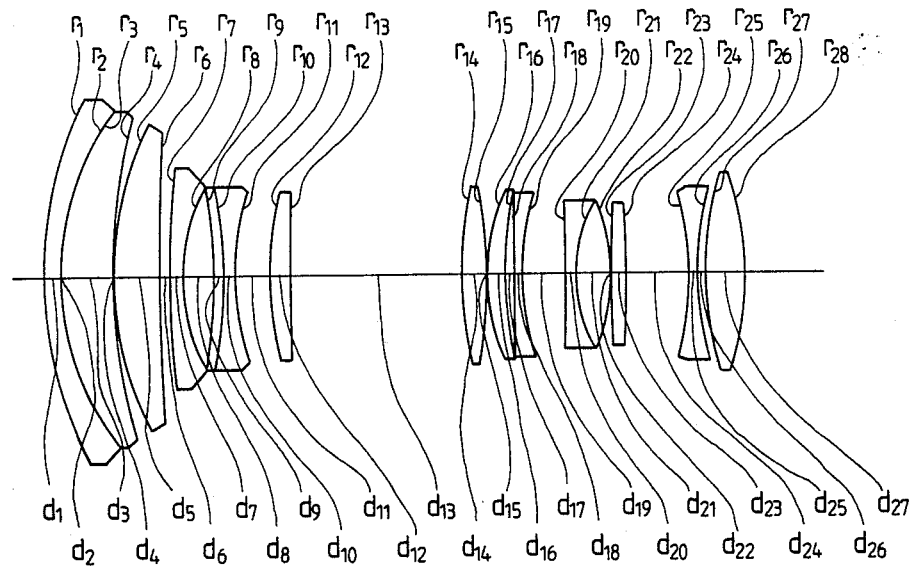
Figure 16:
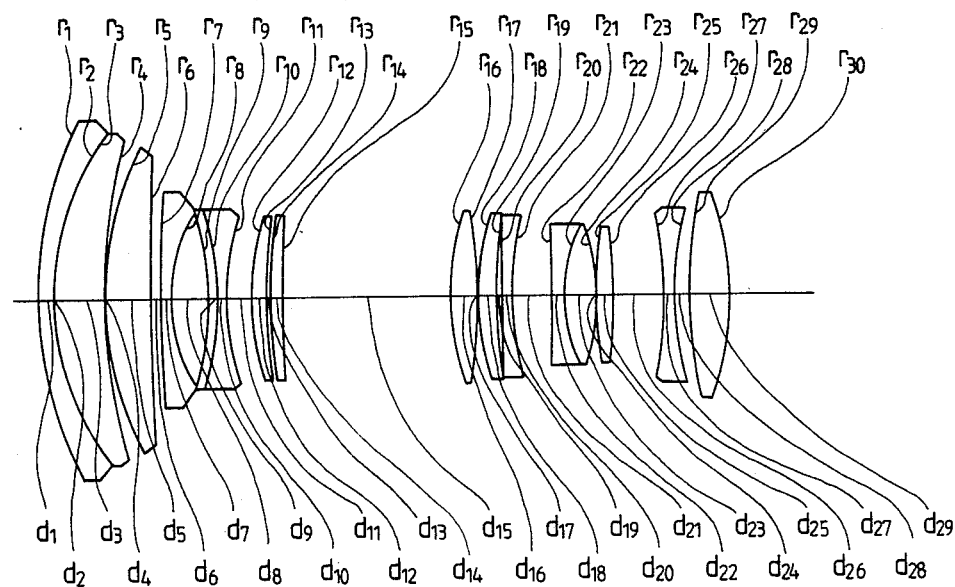
Figure 15A:
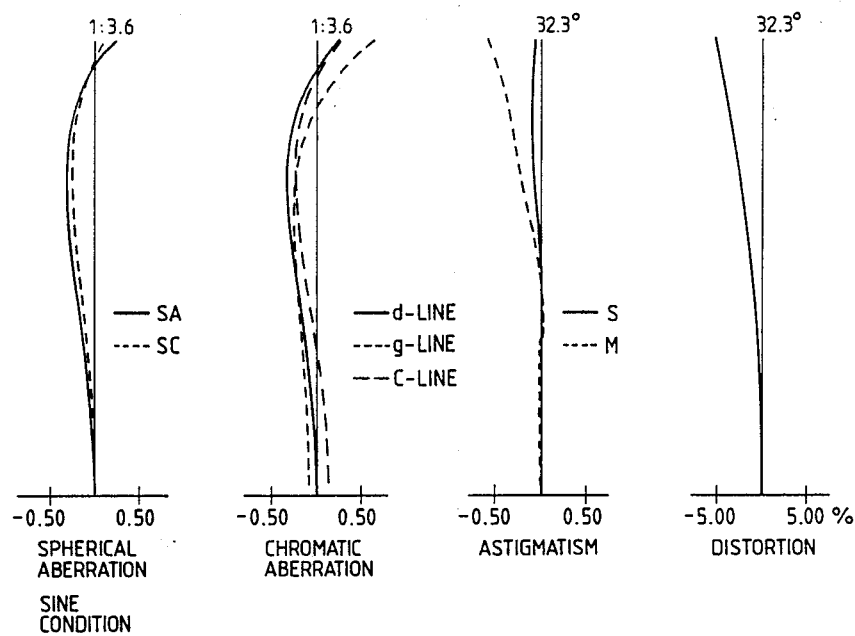
Figure 15B:
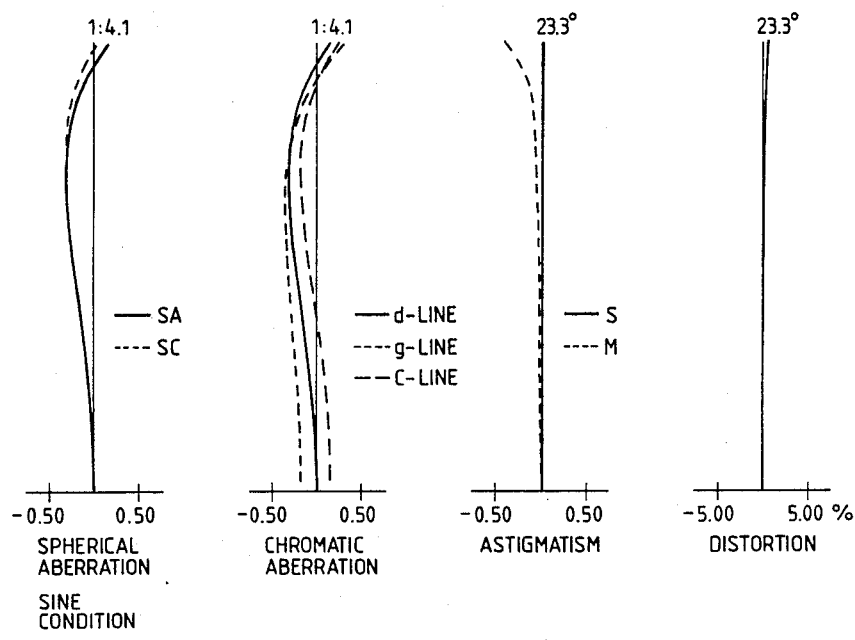
Figure 15C:
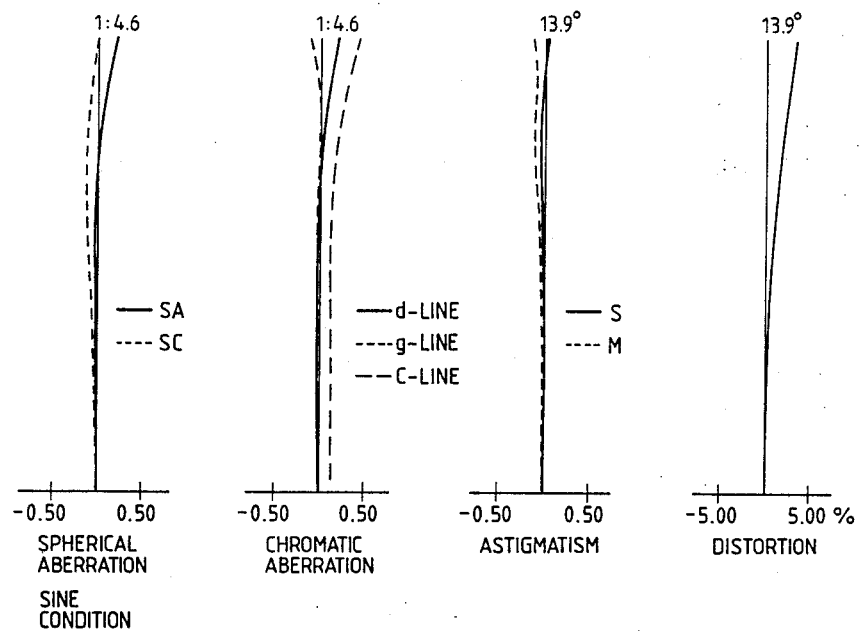
Figure 15D:
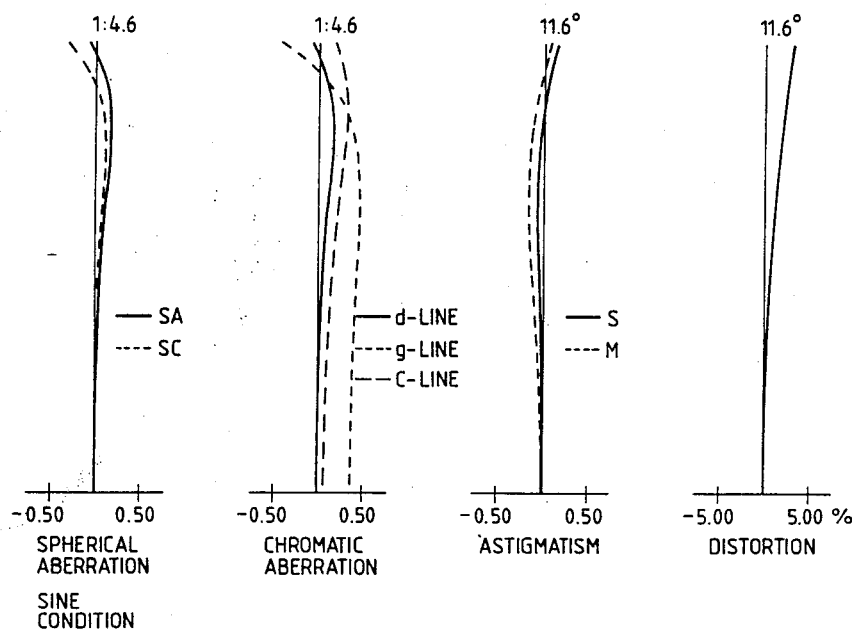
Figure 17A:
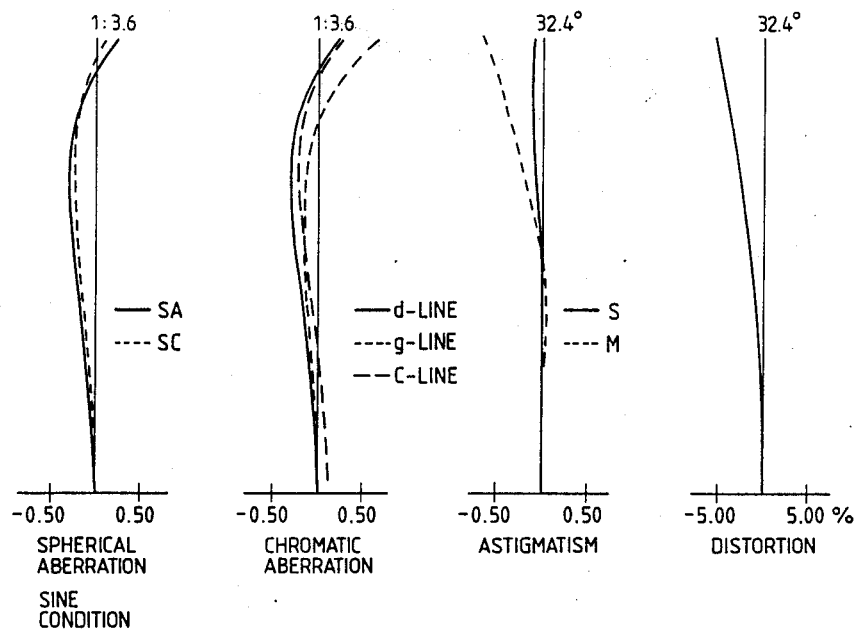
Figure 17B:
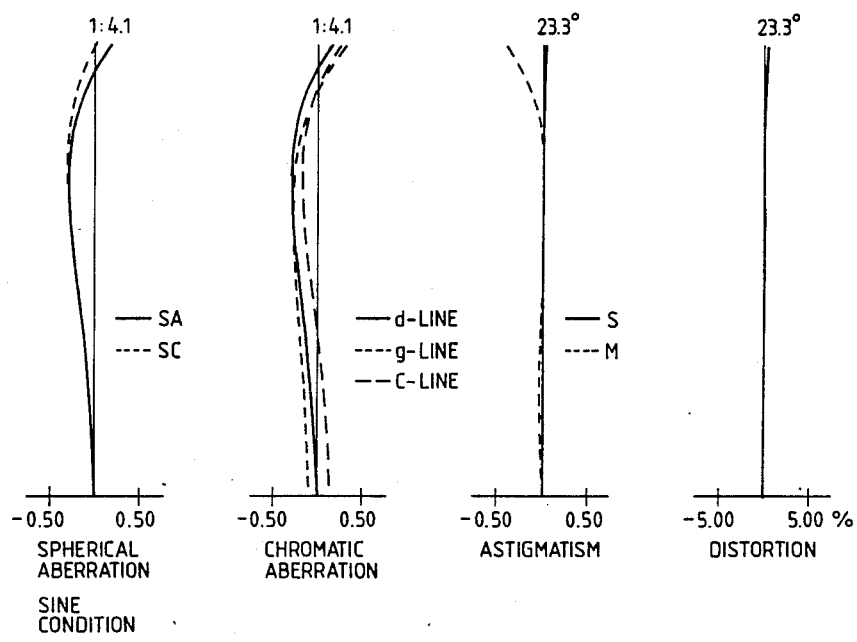
Figure 17C:
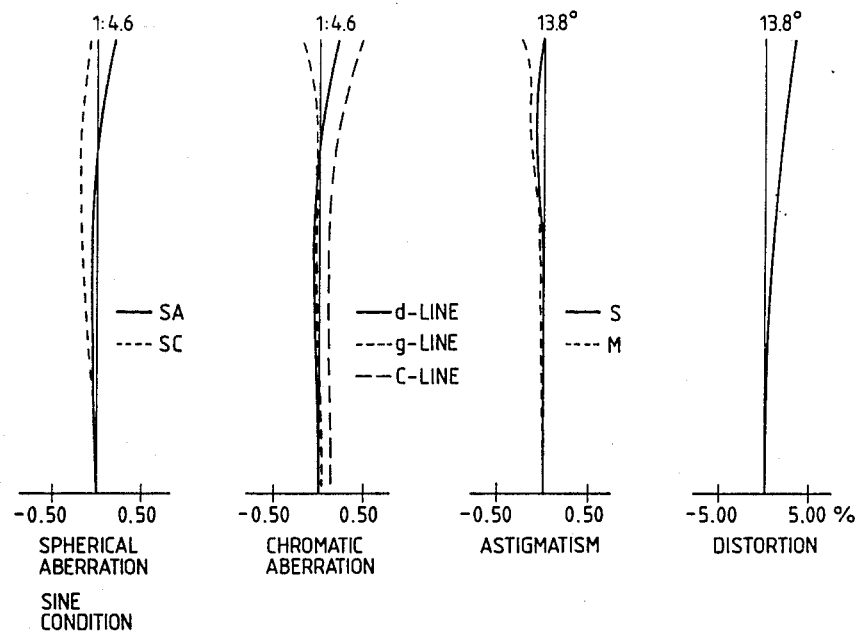
Figure 17D:
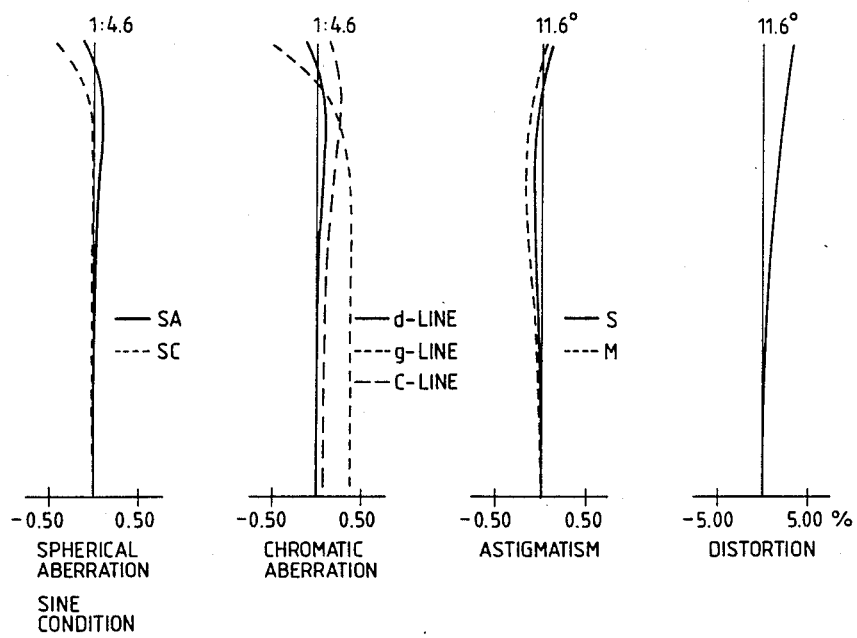
Figure 18A:
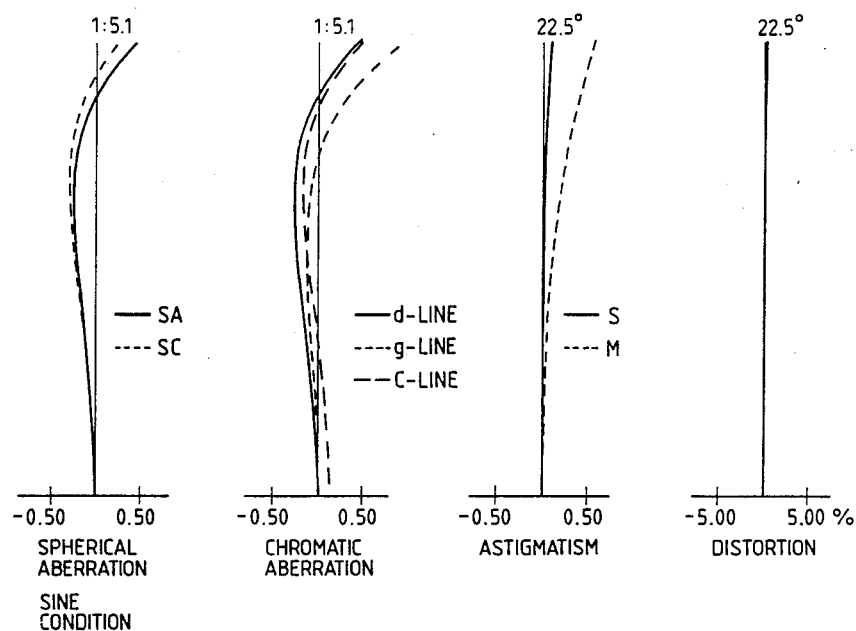
FIGS. 18(A), (B) and (C) are graphs plotting the aberration curves obtained when lens units 3a and 3b are moved simultaneously keeping their distance at the wide-angle end in accordance with the data shown in Example 1, with (A) and (B) referring to the case for the middle focal length and (C) referring to the case for the telephoto end.
Figure 18B:
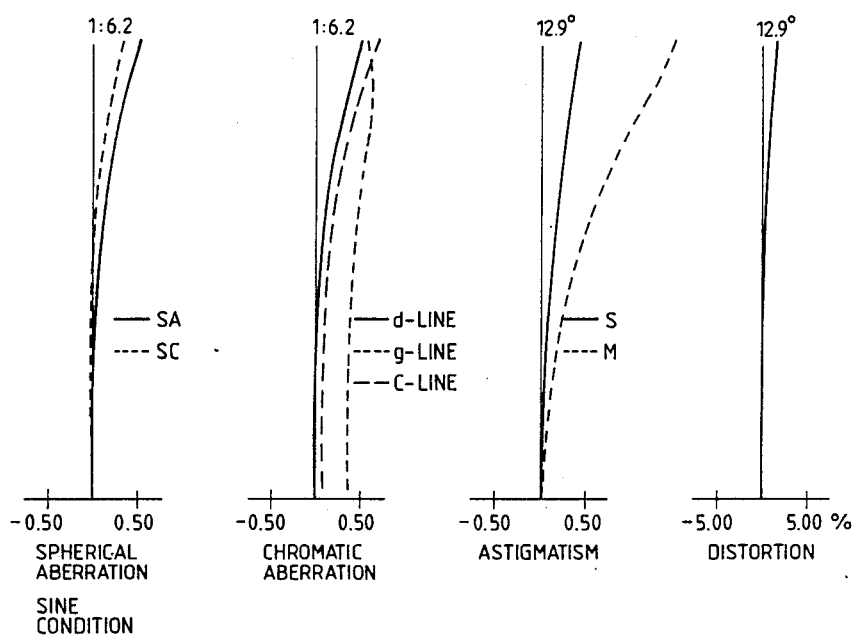
Figure 18C:
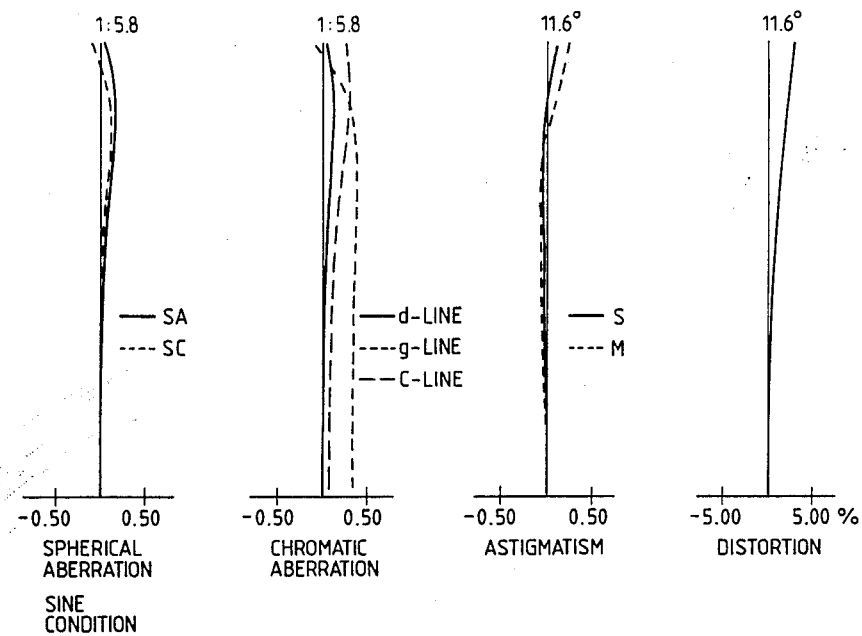

The above-described advantages of the present invention will become apparent by comparing FIG. 9 with FIG. 18. FIG. 9 is a set of graphs plotting the aberration curves obtained with the zoom lens system constructed in accordance with Example 1 adopting the claimed method of moving the two lens units (3a and 3b) of the third lens group independently of each other. FIG. 9(a) is a graph of aberration curves at the wide-angle end; FIGS. 9(b) and 9(c) are graphs of aberration curves at the middle focal length; and FIG. 9(d) is a graph of aberration curves at the telephoto end. FIG. 18 is a set of graphs plotting the aberration curves obtained when lens units 3a and 3b are moved simultaneously keeping their distance at the wide-angle end in accordance with the data shown in Example 1. FIGS. 18(A) and 18(B) are graphs of aberrations curves at the middle focal length, and FIG. 18(C) is a graph of aberration curves at the telephoto end. The distance between two lens units 3a and 3b at the telephoto end is not substantially different from the distance at the wide-angle end, so there is no great increase in aberrations at the telephoto end whether lens units 3a and 3b are moved independently of each other or en masse [compare FIG. 9(d) with FIG. 18(C)]. However, in the range from the middle focal length, especially beyond the point where K is $$0.5 (= \sqrt{f_W f_T}),$$

to the telephoto end, a significant increase tends to occur in astigmatism and curvature of field if lens units 3a and 3b are moved simultaneously with each other [compare FIG. 9(c) with FIG. 18(B)].

Parameter K for the extent of middle focal length is determined by the following equation:

$$K = \frac{\log f_M - \log f_W}{\log f_T - \log f_W} = \frac{\log f_M/f_W}{\log f_T/f_W} = \frac{\log Z_M}{\log Z}$$

Where $f_M = f_W^{1-K} f_T^K$ ($0 < K < 1$).

In accordance with the present invention where lens units 3a and 3b are moved independently of each other, the height at which extra-axial rays of light pass through lens unit 3b will vary as a natural consequence, thereby making it possible too compensate for the variations in astigmatism and curvature of field which will take place when the third lens group is moved en masse.

Conditions (1) and (2) relate to a method of moving lens units 3a and 3b in a certain way. Condition (1) sets forth the requirement to be satisfied by the distance between these lens units at the middle focal length ($K = 0.6-0.9$) as relative to their distance at the telephoto end. If the upper limit of this condition is exceeded, the profile of movement of lens unit 3b from the middle focal length to the telephoto end draws such a steep curve that difficulty is involved in manufacturing a cam mechanism for the lens barrel, and the lens groups will follow the cam movement only in efficiently. If the lower limit of condition (1) is not reached, the third lens group becomes more like a unitary assembly than a two-unit type and it is impossible to effectively compensate for the astigmatism and curvature of field that will occur at the middle focal length.

Conditions (2) sets forth the requirement that should be satisfied by the distance between lens units 3a and 3b at three positions, ie., the wide-angle end, middle focal distance ($K = 0.6-0.9$) and the telephoto end if a three-group composition (i.e., the fourth type of prior art system) is adopted as such and if further reduction in size is realized, spherical aberration and curvature of field can be effectively compensated to attain a good balance at two points in the range of focal lengths (for example, in the neighborhood of the wide-angle end and the telephoto end) but lens performance will deteriorate in the middle focal length ($K = 0.6-0.9$). If the upper limit of condition (2) is exceeded, the change in the distance between lens units 3a and 3b from middle focal length to the telephoto end is too small to effectively compensate for aberrations to attain a good balance at these two points. If the lower limit of condition (3) is not reached, the distance between lens units 3a and 3b will change greatly at the telephoto end and the profile of its movement from the middle focal length to the telephoto end draws such a steep curve that difficulty is involved in manufacturing a cam mechanism for the lens barrel.

Conditions (3) and (4) set forth the requirements to be satisfied by lens unit 3b, If the upper limit of condition (3) is exceeded, the negative power of this lens unit becomes too strong to attain one of the intended objects of the present invention, namely, minimizing deterioration in performance in spite of poor workmanship that might be involved in lens manufacture. If the lower limit of condition (3) is not reached, the negative power of lens unit 3b becomes too small to fully exploit the advantage of moving the lens units 3a and 3b in the way specified herein, and the desired reduction in system size cannot be attained.

If condition (4) is not met, the radius of curvature of lens unit 3b must be adjusted to a very small value in order to assure the negative power of its divergent surface but then, not only will higher-order aberrations take place but also increased flare will occur.

Conditions (5), (6) and (7) set forth the requirements that should be satisfied by the power distribution among the first lens group, the second lens group and lens unit 3a in the third lens group. If the upper limit of condition (5) is exceeded, the result is favorable for the purpose of size reduction but on the other hand, aberrational variations, in particular that of spherical aberration, will increase during zooming or focusing. If the lower limit of condition (5) is not reached, the amount of lens movement is increased, which is against the purpose of realizing a compact system.

If the upper limit of condition (6) is exceeded, the result is favorable for the purpose of size reduction but on the other hand, aberrational variations, in particular that of astigmatism, will increase during zooming. If the lower limit condition (6) is not reached, the purpose of realizing a compact system is not attained.

If the upper limit of condition (7) is exceeded, the result is favorable for the purpose of size reduction but on the other hand, the burden on lens unit 3b is so much increased that great deterioration in performance will occur if relative tilting develops between lens units 3a and 3b on account of poor workmanship in lens manufacture, which is certainly against one of the objectives of the present invention. If the lower limit of condition (7) is not reached, the effect of lens unit 3b is reduced and efficient compensation for aberrations cannot be achieved unless the overall size of the system is increased.

Condition (8) sets forth the requirement that should be satisfied by the second lens group which is chiefly responsible for zooming capability. If this condition is not met, the Petzval sum becomes more likely to be negative and the curvature of field will be overcompensated, in particular at the wide-angle end.

Five examples of the zoom lens system of the prevent invention are described below by way of data sheets, in which $F_{NO}$ signifies an F number, f, focal length $\omega$, a half view angle, $f_B$, back focus, r, the radium of curvature of an individual lens surface, d, lens thickness or aerial distance between lenses N, the refractive index of an individual lens at the d-line, and v, the Abbe number of an individual lens.

| Example 1 | | | |
|---|---|---|---|
| $F_{NO}$ = 1:4.1-5.7 | | f = 36.04-102.00 | |
| $\omega$ = 32.3°-11.7° | | $f_B$ = 37.77-56.19 | |
| Surface No. | r | d | N | v |
|---|---|---|---|---|
| 1 | 47.706 | 1.800 | 1.80518 | 25.4 |
| 2 | 30.620 | 6.551 | 1.65160 | 58.5 |
| 3 | 78.922 | 0.100 | | |
| 4 | 38.144 | 5.086 | 1.58913 | 61.2 |
| 5 | 186.794 | 1.150 | | |
| 6 | 56.199 | 1.200 | 1.83481 | 42.7 |
| 7 | 15.503 | 4.469 | | |

-continued

Example 1

| | | | | |
|---|---|---|---|---|
| 8 | −36.690 | 1.100 | 1.69680 | 55.5 |
| 9 | 19.268 | 2.702 | | |
| 10 | 25.580 | 2.512 | 1.80518 | 25.4 |
| 11 | 322.068 | 16.350 | | |
| 12 | 38.467 | 2.242 | 1.83400 | 37.2 |
| 13 | −151.719 | 0.100 | | |
| 14 | 20.598 | 2.200 | 1.77250 | 49.6 |
| 15 | 67.722 | 0.604 | | |
| 16 | −209.931 | 1.000 | 1.80518 | 25.4 |
| 17 | 37.630 | 4.700 | | |
| 18 | 100.585 | 1.200 | 1.83400 | 37.2 |
| 19 | 13.775 | 4.038 | 1.48749 | 70.2 |
| 20 | −40.975 | 0.266 | | |
| 21 | 268.089 | 2.200 | 1.54072 | 47.2 |
| 22 | −32.718 | 8.666 | | |
| 23 | −135.195 | 1.300 | 1.80610 | 40.9 |
| 24 | 30.293 | 0.608 | | |
| 25 | 29.216 | 3.589 | 1.58144 | 40.7 |
| 26 | −187.630 | | | |

| | (a) | (b) | (c) | (d) |
|---|---|---|---|---|
| f | 36 | 50 | 85 | 102 |
| K | 0 | 0.315 | 0.825 | 1.0 |
| $d_5$ | 1.15 | 6.737 | 13.410 | 17.754 |
| $d_{11}$ | 16.35 | 12.585 | 3.636 | 2.500 |
| $d_{22}$ | 8.666 | 11.367 | 14.736 | 9.000 |
| $f_B$ | 37.77 | 41.12 | 47.99 | 56.19 |

| | (A) | (B) | (C) |
|---|---|---|---|
| $d_5$ | 6.737 | 13.410 | 17.754 |
| $d_{11}$ | 12.585 | 3.636 | 2.500 |
| $d_{22}$ | 8.666 | 8.666 | 8.666 |

Example 2

$F_{NO} = 1:4.1–5.7$   $f = 36.01–102.00$
$\omega = 32.3°–11.7°$   $f_B = 37.77–57.15$

| Surface No. | r | d | N | ν |
|---|---|---|---|---|
| 1 | 46.441 | 1.900 | 1.80518 | 25.4 |
| 2 | 29.890 | 6.615 | 1.62041 | 60.3 |
| 3 | 76.291 | 0.100 | | |
| 4 | 37.837 | 5.086 | 1.60311 | 60.7 |
| 5 | 207.595 | 1.150 | | |
| 6 | 63.413 | 1.200 | 1.77250 | 49.6 |
| 7 | 15.586 | 4.478 | | |
| 8 | −39.259 | 1.100 | 1.77250 | 49.6 |
| 9 | 20.976 | 3.073 | | |
| 10 | 28.299 | 2.507 | 1.80518 | 25.4 |
| 11 | 1922.312 | 16.490 | | |
| 12 | 60.074 | 1.941 | 1.83400 | 37.2 |
| 13 | −138.475 | 0.100 | | |
| 14 | 21.836 | 2.600 | 1.77250 | 49.6 |
| 15 | 164.256 | 0.461 | | |
| 16 | −131.039 | 1.100 | 1.80518 | 25.4 |
| 17 | 57.905 | 5.500 | | |
| 18 | 102.847 | 1.200 | 1.83400 | 37.2 |
| 19 | 13.921 | 4.341 | 1.48749 | 70.2 |
| 20 | −36.612 | 0.166 | | |
| 21 | 300.282 | 2.100 | 1.54072 | 47.2 |
| 22 | −39.912 | 8.472 | | |
| 23 | −159.701 | 1.300 | 1.80610 | 40.9 |
| 24 | 28.889 | 0.611 | | |
| 25 | 28.104 | 3.664 | 1.58144 | 40.7 |
| 26 | −321.541 | | | |

| | (a) | (b) | (c) | (d) |
|---|---|---|---|---|
| f | 36 | 50 | 85 | 102 |
| $d_5$ | 1.15 | 5.081 | 12.832 | 17.215 |
| $d_{11}$ | 16.49 | 9.578 | 3.435 | 2.500 |
| $d_{22}$ | 8.472 | 12.450 | 14.935 | 9.000 |
| $f_B$ | 37.77 | 40.02 | 48.34 | 57.15 |

Example 3

$F_{NO} = 1:4.5–5.7$   $f = 36.01–102.00$
$\omega = 32.2°–11.6°$   $f_B = 42.32–50.59$

| Surface No. | r | d | N | ν |
|---|---|---|---|---|
| 1 | 47.187 | 1.800 | 1.80518 | 25.4 |
| 2 | 28.141 | 7.188 | 1.65160 | 58.5 |
| 3 | 74.858 | 0.100 | | |
| 4 | 35.298 | 5.116 | 1.63854 | 55.4 |
| 5 | 175.359 | 1.200 | | |
| 6 | 70.830 | 1.200 | 1.83481 | 42.7 |
| 7 | 16.479 | 4.000 | | |
| 8 | −51.238 | 1.100 | 1.69680 | 55.5 |
| 9 | 17.309 | 3.338 | | |
| 10 | 23.866 | 2.500 | 1.84666 | 23.9 |
| 11 | 82.130 | 17.149 | | |
| 12 | 28.608 | 2.627 | 1.83400 | 37.2 |
| 13 | −101.002 | 0.100 | | |
| 14 | 18.783 | 2.041 | 1.77250 | 49.6 |
| 15 | 41.339 | 0.637 | | |
| 16 | 529.593 | 1.000 | 1.80518 | 25.4 |
| 17 | 30.495 | 2.769 | | |
| 18 | −652.591 | 1.000 | 1.83400 | 37.2 |
| 19 | 12.424 | 3.981 | 1.48749 | 70.2 |
| 20 | −35.133 | 0.100 | | |
| 21 | 5354.456 | 1.800 | 1.53172 | 48.9 |
| 22 | −33.165 | 5.607 | | |
| 23 | −74.974 | 1.300 | 1.80610 | 40.9 |
| 24 | 43.605 | 0.698 | | |
| 25 | 41.879 | 5.000 | 1.52310 | 50.8 |
| 26 | −45.303 | | | |

| | (a) | (b) | (c) | (d) |
|---|---|---|---|---|
| f | 36 | 50 | 85 | 102 |
| $d_5$ | 1.200 | 4.567 | 13.231 | 16.556 |
| $d_{11}$ | 17.149 | 10.451 | 4.514 | 2.500 |
| $d_{22}$ | 5.607 | 13.228 | 17.585 | 12.001 |
| $f_B$ | 42.32 | 40.61 | 43.00 | 50.59 |

Example 4

$F_{NO} = 1:3.6–4.6$   $f = 36.01–102.00$
$\omega = 32.3°–11.6°$   $f_B = 40.18–56.16$

| Surface No. | r | d | N | ν |
|---|---|---|---|---|
| 1 | 46.826 | 1.900 | 1.80518 | 25.4 |
| 2 | 30.350 | 0.109 | | |
| 3 | 30.661 | 6.655 | 1.60311 | 60.7 |
| 4 | 70.885 | 0.100 | | |
| 5 | 36.988 | 5.300 | 1.60311 | 60.7 |
| 6 | 279.853 | 1.200 | | |
| 7 | 125.955 | 1.200 | 1.83481 | 42.7 |
| 8 | 17.820 | 4.000 | | |
| 9 | −52.065 | 1.500 | 1.80518 | 25.4 |
| 10 | −40.385 | 1.000 | 1.69680 | 55.5 |
| 11 | 24.387 | 4.347 | | |
| 12 | 33.936 | 2.498 | 1.80518 | 25.4 |
| 13 | 356.199 | 20.543 | | |
| 14 | 37.084 | 2.700 | 1.83481 | 42.7 |
| 15 | −117.372 | 0.100 | | |
| 16 | 21.577 | 2.500 | 1.77250 | 49.6 |
| 17 | 50.256 | 0.733 | | |
| 18 | 289.390 | 1.100 | 1.80518 | 25.4 |
| 19 | 34.461 | 5.345 | | |
| 20 | 287.500 | 1.000 | 1.83400 | 37.2 |
| 21 | 14.319 | 4.300 | 1.48749 | 70.2 |
| 22 | −35.909 | 0.100 | | |
| 23 | 83.696 | 2.000 | 1.60342 | 38.0 |
| 24 | −104.410 | 7.463 | | |
| 25 | −43.168 | 1.350 | 1.83400 | 37.2 |
| 26 | 40.373 | 0.973 | | |
| 27 | 42.446 | 4.809 | 1.56732 | 42.8 |
| 28 | −32.660 | | | |

| | (a) | (b) | (c) | (d) |
|---|---|---|---|---|
| f | 36 | 50 | 85 | 102 |
| $d_6$ | 1.200 | 6.273 | 14.709 | 17.895 |
| $d_{13}$ | 20.543 | 12.543 | 4.548 | 2.500 |

-continued

Example 4

| d$_{24}$ | 7.463 | 12.488 | 14.262 | 9.000 |
|---|---|---|---|---|
| f$_B$ | 40.18 | 39.09 | 46.08 | 56.16 |

Example 5

F$_{NO}$ = 1:3.6–4.6    f = 36.11–102.00
ω = 32.4°–11.6°    f$_B$ = 40.50–54.56

| Surface No. | r | d | N | ν |
|---|---|---|---|---|
| 1 | 45.368 | 1.900 | 1.80518 | 25.4 |
| 2 | 29.670 | 0.0 | | |
| 3 | 29.670 | 6.137 | 1.60311 | 60.7 |
| 4 | 69.013 | 0.100 | | |
| 5 | 39.609 | 5.300 | 1.60311 | 60.7 |
| 6 | 262.071 | 1.200 | | |
| 7 | 133.017 | 1.200 | 1.83481 | 42.7 |
| 8 | 17.481 | 4.000 | | |
| 9 | −53.536 | 1.500 | 1.80518 | 25.4 |
| 10 | −41.879 | 1.200 | 1.69680 | 55.5 |
| 11 | 24.141 | 3.146 | | |
| 12 | 34.754 | 1.700 | 1.80518 | 25.4 |
| 13 | 71.983 | 0.300 | | |
| 14 | 41.717 | 1.500 | 1.80518 | 25.4 |
| 15 | 115.126 | 20.349 | | |
| 16 | 32.925 | 2.900 | 1.83481 | 42.7 |
| 17 | −108.673 | 0.100 | | |
| 18 | 21.713 | 2.500 | 1.77250 | 49.6 |
| 19 | 53.475 | 0.722 | | |
| 20 | 779.405 | 1.100 | 1.80518 | 25.4 |
| 21 | 32.872 | 4.732 | | |
| 22 | 305.579 | 1.000 | 1.83400 | 37.2 |
| 23 | 13.710 | 4.300 | 1.48749 | 70.2 |
| 24 | −38.430 | 0.100 | | |
| 25 | 81.192 | 2.000 | 1.60342 | 38.0 |
| 26 | −97.926 | 6.236 | | |
| 27 | −46.358 | 1.350 | 1.83400 | 37.2 |
| 28 | 40.000 | 1.494 | | |
| 29 | 44.344 | 4.941 | 1.56732 | 42.8 |
| 30 | −33.411 | | | |

| | (a) | (b) | (c) | (d) |
|---|---|---|---|---|
| f | 36 | 50 | 85 | 102 |
| d$_6$ | 1.20 | 6.737 | 15.493 | 19.016 |
| d$_{15}$ | 20.349 | 12.585 | 4.530 | 2.500 |
| d$_{26}$ | 6.236 | 11.367 | 14.388 | 9.000 |
| f$_B$ | 40.50 | 39.00 | 44.53 | 54.56 |

Numerical Values Assigned to Various Parameters In Examples 1-5

| Parameter | Example 1 | 2 | 3 | 4 | 5 |
|---|---|---|---|---|---|
| $\frac{D_M-D_T}{f_T-f_M}$ | 0.337 | 0.349 | 0.328 | 0.309 | 0.317 |
| $\frac{D_M-D_S}{D_M-D_T}$ | 1.058 | 1.089 | 2.145 | 1.292 | 1.513 |
| (K) | (0.825) | (0.825) | (0.825) | (0.825) | (0.825) |
| f$_w$/|f$_{3b}$| | 0.326 | 0.359 | 0.146 | 0.236 | 0.211 |
| N$_{3bn}$ | 1.806 | 1.806 | 1.806 | 1.834 | 1.834 |
| f$_w$/f$_1$ | 0.573 | 0.577 | 0.624 | 0.574 | 0.546 |
| f$_w$/f$_1$ $_2$ | −1.275 | −1.276 | −1.282 | −1.131 | −1.135 |
| f$_w$/f$_1$ $3_a$ | 1.394 | 1.428 | 1.253 | 1.395 | 1.389 |
| N$_{zn}$ | 1.766 | 1.773 | 1.766 | 1.766 | 1.766 |

Figure 8:
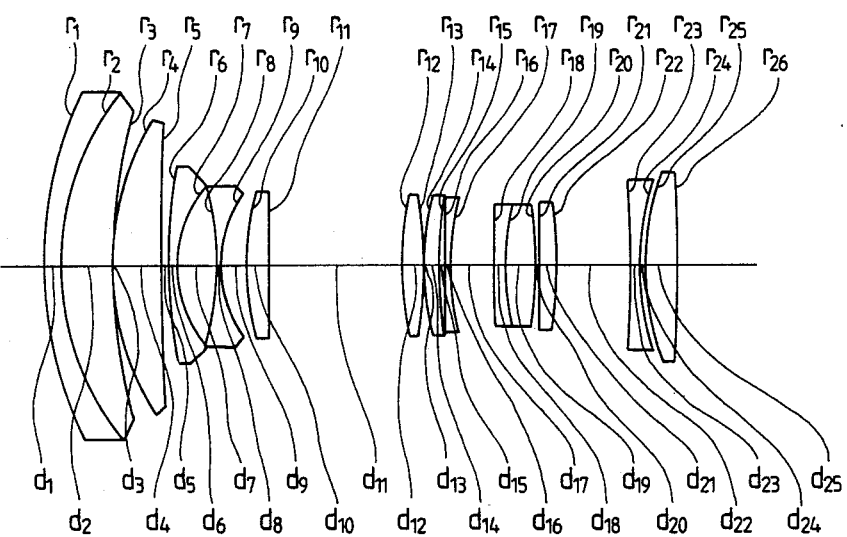
FIGS. 8, 10, 12, 14 and 16 are simplified cross sectional views of zoom lens systems at the wide-angle end that are constructed in accordance with Examples 1, 2, 3, 4 and 5, respectively, of the present invention.

The following description concerns with a macro system for use with a zoom lens system, shown in FIG. 8, that is intended to be used in a 35 mm still camera providing not only coverage varying from a wide-angle end to a telephoto end but also a high zoom ratio and which is composed of a positive, a negative, a positive and a negative lens group, totaling four in the number of end group (FIGS. 19 to 27).

There are two basic methods for achieving focusing of zoom lens systems that have coverage of a wide visual field and which are capable of attaining high zoom ratio. One of them is the old method which performs focusing by moving a first lens group. The other approach is a new method which has been recently disclosed in patent literature; its focusing technique depends on moving en masse either a first and a second lens group or a third, a fourth and a fifth lens group in a zoom lens system composed of a positive, a negative, a positive, a negative and a positive lens group, totaling five in the number of lens groups.

It is fairly easy to reduce the closest focusing distance in the new focusing method. On the other hand, if one wants to reduce the closest focusing distance at the wide-angle end in the old focusing method, brightness of the edge of image field will decrease so greatly that it is practically impossible to reduce the closest focusing distance. Therefore, in order to compensate for this comparatively large value of the closest focusing distance that can be achieved in the old focusing method, several macro systems have been invented and reduced to practice that are capable of shooting the object even if the lens is brought even closer to it.

These macro systems include:

(i) an overall system focusing method [e.g., the one described in JP-A-U No. 59-17411 (the term "JP-A-U" as used herein means an "unexamined published Japanese utility model application")];

(ii) a method in which a first lens group at the telephoto end (or inclusive of the middle focal length) is further advanced from the closest focusing distance [an example of this method is described in JP-A No. 54-139724]; and (iii) a method in which some of the lens groups (for example, all or some of the lens groups other than a first lens group) at the telephoto end are moved (examples of this method are described in JP-A No. 49-42361 and JP-A No. 50-3354).

In addition to these methods, the assignee of subject application previously proposed an invention of the following:

(iv) a macro system for use with a zoom lens system composed of a positive, a negative, a positive and a positive lens group, in which the first lens group is fixed and the second lens group is moved toward the object, with one or both of the third and fourth lens groups being moved in such a way as to increase their distance (Japanese Patent Application No. 62-267715).

However, the four conventional macro systems described above have their own problems. The first-mentioned system (i) is the simplest in its lens (optical) composition but it requires complex and bulky hardware, with the additional disadvantage of heavy weight due to the need to advance all lens groups simultaneously. The second system (ii) is mechanically the simplest; however, the first lens group has to be moved by a large amount during focusing and it is also moved during zooming, so its stability can easily be lost during operations; in addition, spherical aberration is undercompensated and field curvature overcompensated, producing great aberrational variations at maximum magnification on the mac side (see accompanying FIG. 25). The third system (iii) requires a smaller amount of lens movement and is simple in composition, but it will experience substantial deterioration in performance (see FIGS. 26 and 27).

The problems of systems (i), (ii) and (iii) are successfully solved by system (iv) but Japanese Patent Application No. 62-267715 does not show the concept of a macro system for use with a zoom lens system composed of a positive, a negative, a positive and a negative lens group, totaling four in the number of lens groups. The reasons are as follows: when zooming is effected from the wide-angle end to the telephoto end with a known zoom lens system composed of a positive, a negative, a positive and a negative lens group, the distance between the third and fourth lens groups will increase, so the fourth lens group cannot be moved by the necessary amount toward the image plane at the telephoto end; if the fourth lens group is moved toward the object, the zooming effect is canceled and not only does this necessitate an increase in the amount of movement of other lens groups (i.e., second and third lens groups) but it also causes increased aberrations.

The present invention has been accomplished in order to solve these problems and an object thereof is to provide a macro system for use with a zoom lens system that has coverage of a wide visual field and which is capable of achieving high zoom ratio. The zoom lens system with which the macro system of the present as shown in FIG. 8 (Example 1), a positive first lens group, a negative second lens group and a positive third lens group, and the third lens group is divided into a positive lens unit ($3a$) and a negative lens unit ($3b$) during zooming so as to produce a lens system that is composed of a positive, a negative, a positive and a negative lens group, totaling four in the number of lens groups. In accordance with the present invention, focusing is performed by the "old method" described in connection with the prior art systems, whereas the macro system (iii) is employed with some modification being made thereto. As a result, the necessary amount of lens movement is reduced and a compact zoom lens system is realized that is comparatively simple in mechanical aspects and which yet assures good performance.

In accordance with the present invention, ordinary focusing is performed by moving the first lens group, and if close-up shooting is necessary, the first lens group is fixed at the telephoto end, and the second lens group is moved toward the object while one or both of lens units $3a$ and $3b$ in the third lens group are moved so as to increase simultaneously the distance between the second lens group and lens unit $3a$ and the distance between lens units $3a$ and $3b$.

Figure 1A:
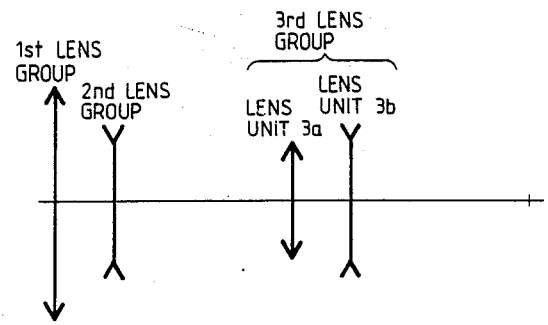
FIGS. 1a–1c shows the layout of lens groups in the zoom lens system of the present invention, as well as the curves drawn by the profile of lens movement.
Figure 1B:
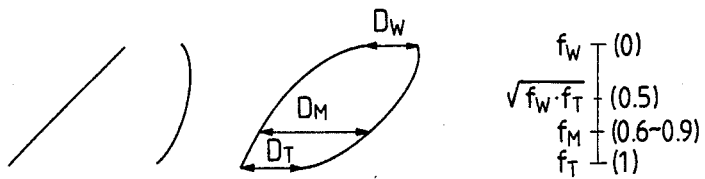
Figure 1C:
Figure 2A:
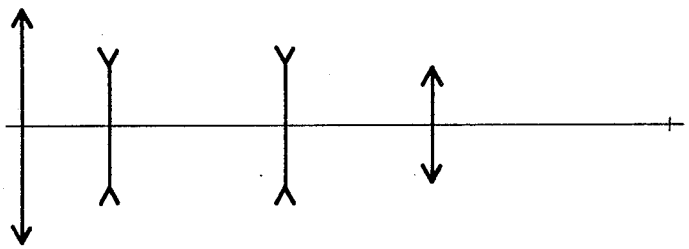
Figure 2B:

One of the following three methods is preferably used to move the second lens group and one or both of lens units $3a$ and $3b$ in the third lens group independently of one another so as to increase simultaneously the distance between the second lens group and lens unit $3b$ and the distance between lens units $3a$ and $3b$ when shooting the object at the closest distance:

(a) the second lens group is moved toward the object, lens unit $3a$ is fixed, and lens unit $3b$ is moved toward the image plane (see accompanying FIG. 1);

(b) the second end group is moved toward the object, lens unit $3a$ is moved toward the object by a smaller amount than the second lens group, and lens unit $3b$ is moved toward the image plane; and (c) the second lens group is moved toward the object, lens unit $3a$ is moved toward the object by a smaller amount than the second lens group, and lens unit $3b$ is fixed.

The zoom lens system with which the macro method of the present invention is to b used adopts the following method of lens movement: when zooming from the wide-angle end to the telephoto end, all of the first lens group, the second lens group, and lens units $3a$ and $3b$ in the third lens group, or the first lens group and lens units $3a$ and $3b$ are moved toward the object in such a way that (A) the distance between the first and second lens groups is increase, (B) the distance between the second lens group and lens unit $3a$ is decreased, and (C) the distance between lens units $3a$ and $3b$ is increased when zooming from the wide-angle end to the middle focal length, and decreased when zooming form the middle focal length to the telephoto end.

Therefore, this zoom lens system is characterized in that the relationship between lens units $3a$ and $3b$ in the third lens group at the telephoto end is substantially the same as their relationship at the wide-angle end.

This zoom lens system differs from the conventional four-group system composed of a positive, a negative, a positive and a positive (or negative) lens group with respect to the relationship between the third and fourth lens groups (corresponding to lens units $3a$ and $3b$ in the present invention) at the telephoto end.

Stated more specifically, in a conventional four-group system composed of a positive, a negative, a positive and a positive lens group, the distance between the third and fourth lens groups is reduced when zooming from the wide-angle end to the telephoto end, and in a conventional four-group system composed of a positive, a negative, a positive and a negative lens group, the distance between the third and fourth lens group is increased when zooming from the wide-angle end to the telephoto end.

This difference in the method of lens movement during zooming as related to the macro system of the present invention is described hereinafter in detail. As already mentioned, no zooming effect is achieved by relative movement of the third and fourth lens groups in a conventional four group system composed of a positive, a negative, a positive and a positive lens group, but curvature of field can be compensated by increasing the distance between the third and fourth lens groups. On the other hand, another conventional four-group system composed of a positive, a negative, a positive and a negative lens group has the fourth negative lens group disposed at such a position that it cannot be moved any further toward the image plane by a sufficient amount to enable imaging in the macro range.

In contrast, the zoom lens system with which the macro system of the present invention is to be used adopts such a method of lens movement that both lens units $3a$ and $3b$ in the third lens group and moved toward the object during zooming, and this allows lens unit $3b$ to be further moved toward the image plane for shooting in the macro range.

In addition, lens unit $3b$ has a negative focal length, so unlike in a zoom lens system composed of a positive, a negative, a positive and a positive lens group, the increase in the distance between lens units $3a$ and $3b$ results in a higher zoom ratio, thereby reducing the required amount of movement of the second lens group.

If zooming is effected with conditions (A), (B) and (C) being satisfied, a state close to the one attained by advancing the overall lens system substantially at the middle focal length is realized by moving the second lens group toward the object in the macro range while one or both of lens units $3a$ and $3b$ are moved in such a way that the distance between the second lens group and lens unit $3a$ and the distance between lens units $3a$n and 3b are increased simultaneously. This state will contribute the maintenance of good performance of the zoom lens system.

While there are several methods for increasing the distance between lens units 3a and 3b during shooting in the macro range, the following two are preferred because of the sample mechanisms they require: (i) fixing lens unit 3a and moving lens unit 3b toward the image plane; and (ii) fixing lens unit 3b and moving lens unit 3a toward the object by a smaller amount than the second lens group.

EXAMPLE

Figure 19:
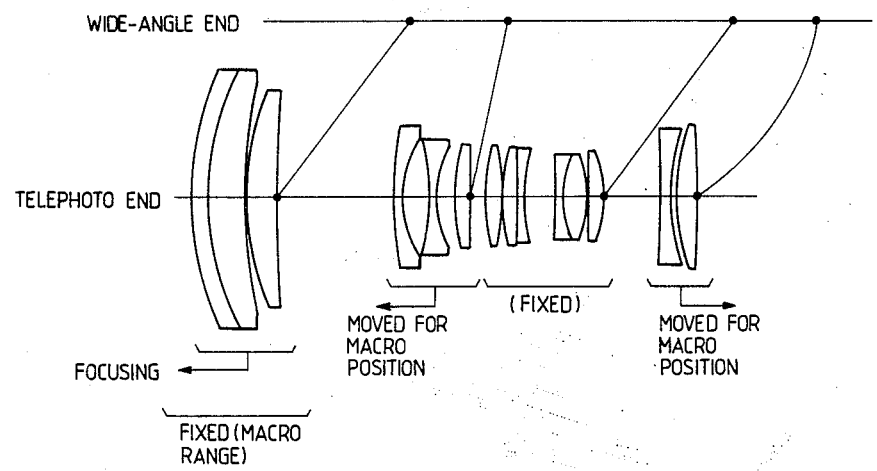
FIG. 19 is a simplified cross-sectional view of the master lens of the present invention (same as FIG. 8) at the telephoto end, with the object being at infinity (the arrows indicating lens movements effected in Case 1 to attain macro position in Example 6)

Before describing several examples of the present invention, data is given below for the zoom lens system (hereinafter referred o as the master lens) with which the macro system of the present invention is to be used, on the assumption that the object is at infinity. A simplified cross-sectional view of this master lens is depicted in FIG. 19.

Data of Master Lens

In the following data sheet, $F_{NO}$ signifies and F number, f, focal length, $\omega$, a half view angle, $f_B$, back focus, r, the radius of curvature of an individual lens, d, lens thickness or the aerial distance between lenses, N, the refractive index of an individual lens at the d-line, and v, the Abbe number of an individual lens.

| | $F_{NO}$ = 1:5.6<br>$\omega$ = 11.7° | | f = 102.00<br>$f_B$ = 56.19 | |
|---|---|---|---|---|
| Surface No. | r | d | N | v |
| 1 | 47.706 | 1.80 | 1.80518 | 25.4 |
| 2 | 30.620 | 6.55 | 1.65160 | 58.5 |
| 3 | 78.922 | 0.10 | | |
| 4 | 38.144 | 5.09 | 1.58913 | 61.2 |
| 5 | 186.794 | 17.75 | | |
| 6 | 56.199 | 1.20 | 1.83481 | 42.7 |
| 7 | 15.503 | 4.47 | | |
| 8 | −36.690 | 1.10 | 1.69680 | 55.5 |
| 9 | 19.268 | 2.70 | | |
| 10 | 25.580 | 2.51 | 1.80518 | 25.4 |
| 11 | 322.068 | 2.50 | | |
| 12 | 38.467 | 2.24 | 1.83400 | 37.2 |
| 13 | −151.719 | 0.10 | | |
| 14 | 20.598 | 2.20 | 1.77250 | 49.6 |
| 15 | 67.722 | 0.60 | | |
| 16 | −209.931 | 1.00 | 1.80518 | 25.4 |
| 17 | 37.630 | 4.70 | | |
| 18 | 100.585 | 1.20 | 1.83400 | 37.2 |
| 19 | 13.775 | 4.04 | 1.48749 | 70.2 |
| 20 | −40.975 | 0.27 | | |
| 21 | 268.089 | 2.20 | 1.54072 | 47.2 |
| 22 | −32.718 | 9.00 | | |
| 23 | −135.195 | 1.30 | 1.80610 | 40.9 |
| 24 | 30.293 | 0.61 | | |
| 25 | 29.216 | 3.59 | 1.58144 | 40.7 |
| 26 | −187.630 | | | |

Figure 3:
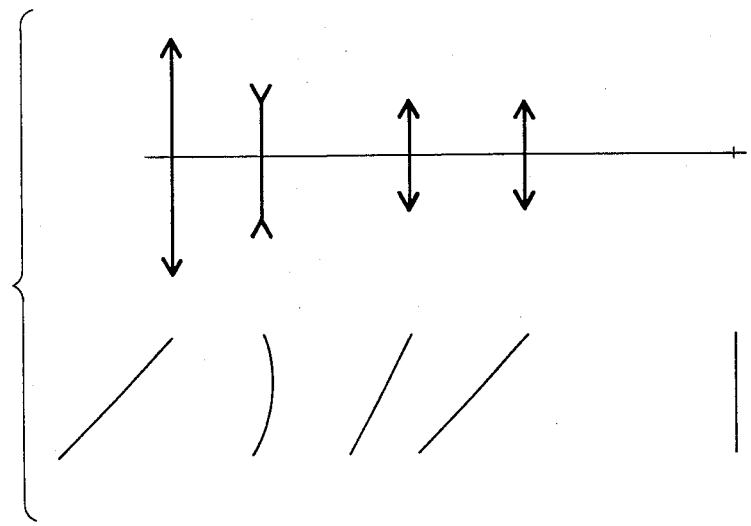
Figure 20:
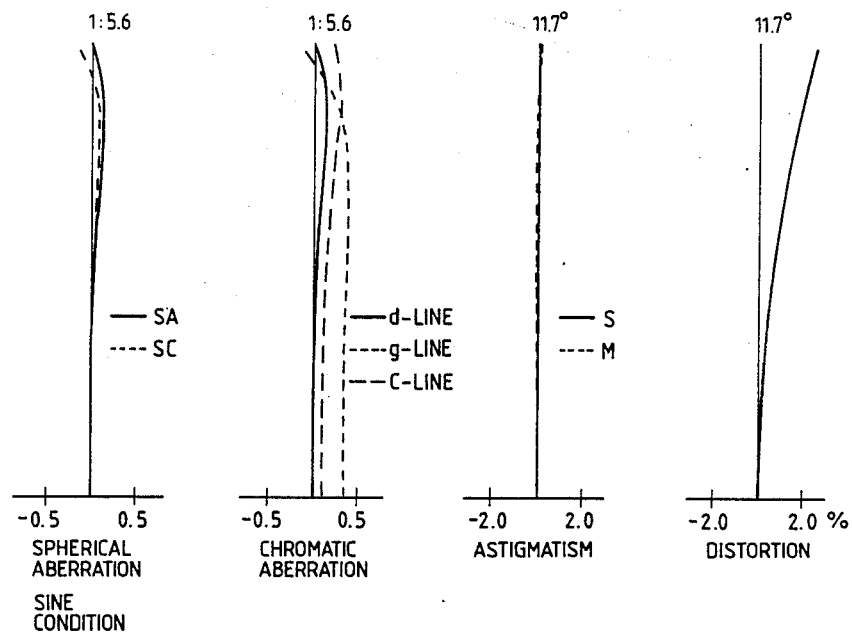
FIG. 20 is a graph plotting the aberration curves obtained for an infinitely distant object with the master lens at the telephoto end.

FIG. 20 is a graph plotting the aberration curves obtained for an infinitely distant object with the master lens at the telephoto end. FIG. 3 is a graph plotting the aberration curves obtained with the same master lens at the closest focusing distance of 1.4 m.

Three examples of the present invention and an equal number of comparative examples are shown below with reference to cases where the master lens at the closest focusing distance of 1.4 m was moved in various ways to perform shooting in the macro range (m = −¼).

EXAMPLE 6

Figure 4:
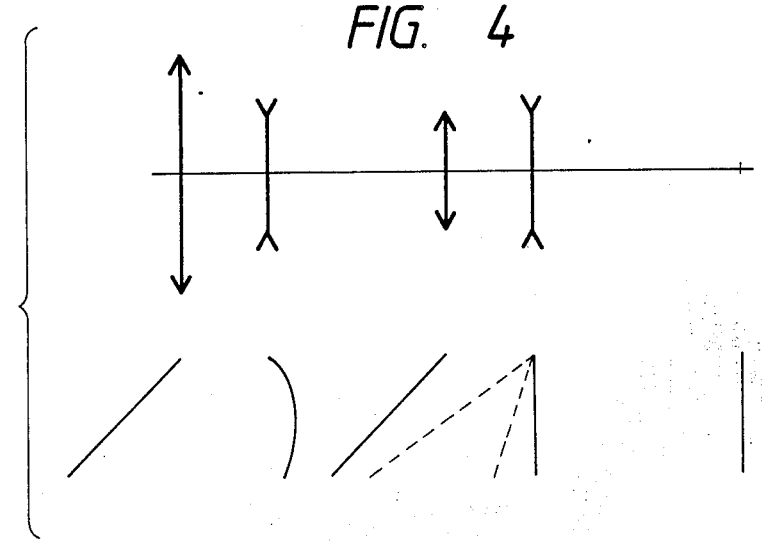
Figure 5B:
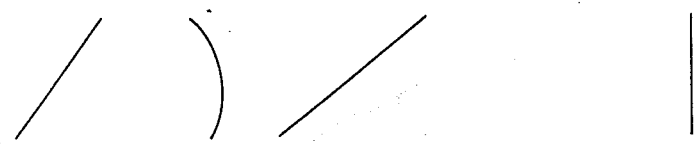
Figure 7:
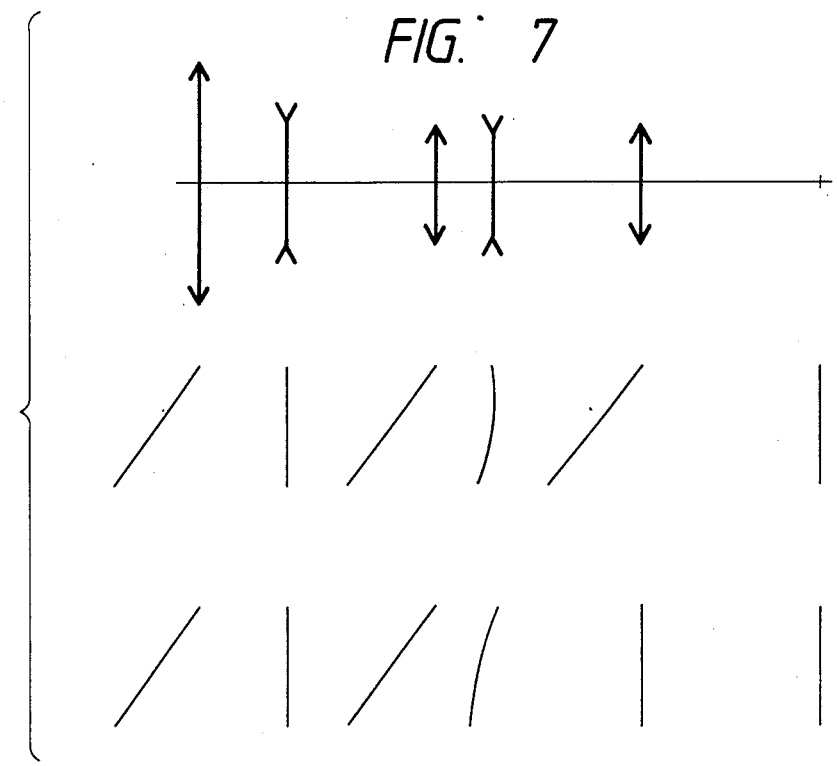
Figure 22:
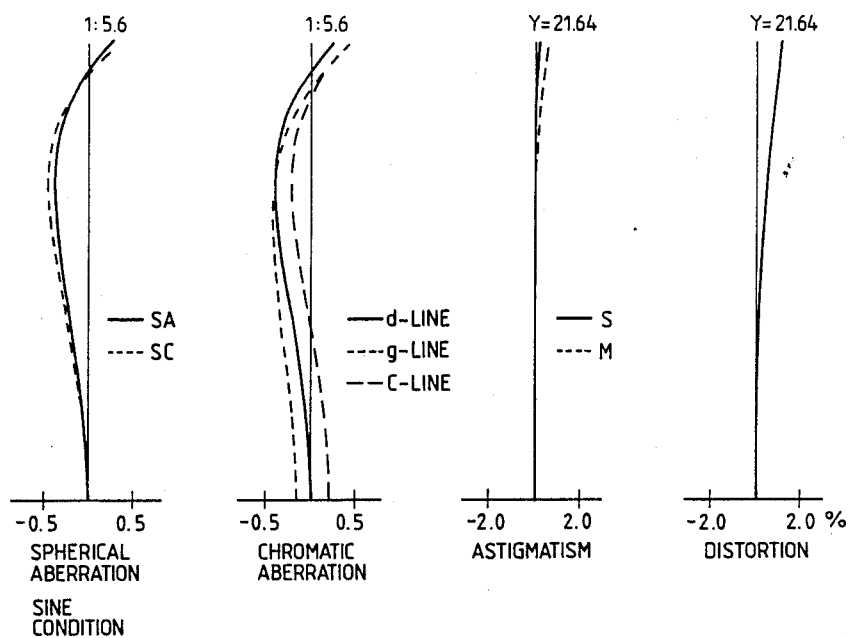
FIG. 22 is a graph plotting the aberration curves obtained when the master lens is moved as specified in Example 6 (Case 1)

Case 1 where macro position is attained by moving the second lens group toward the object, fixing lens unit 3a in the third lens group, and moving lens unit 3b toward the image plane:

Lens movements in this case are indicated by arrows in FIG. 22, and a graph plotting the aberration curves obtained at macro magnification (m) of −¼ is shown in FIG. 4.

EXAMPLE 7

Figure 23:
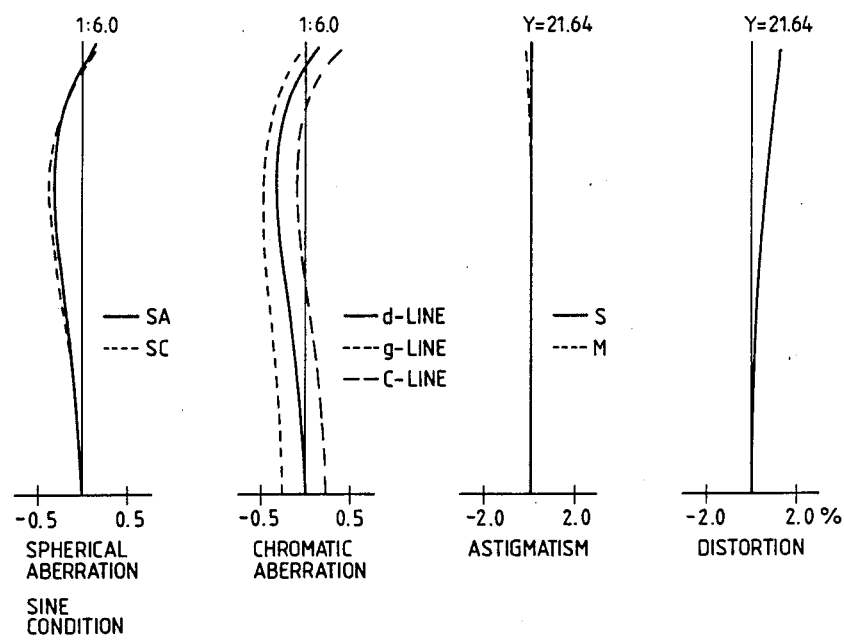
FIG. 23 is a graph plotting the aberration curves obtained when the master lens is moved as specified in Example 7 (Case 2)

Case 2 where macro position is attained by moving the second lens group toward the object, moving lens unit 3a in the same direction but by a smaller amount, and moving lens unit 3b toward the image plane:

FIG. 23 is a graph plotting the aberration curves obtained in this case at macro magnification (m) of −¼.

EXAMPLE 3

Figure 24:
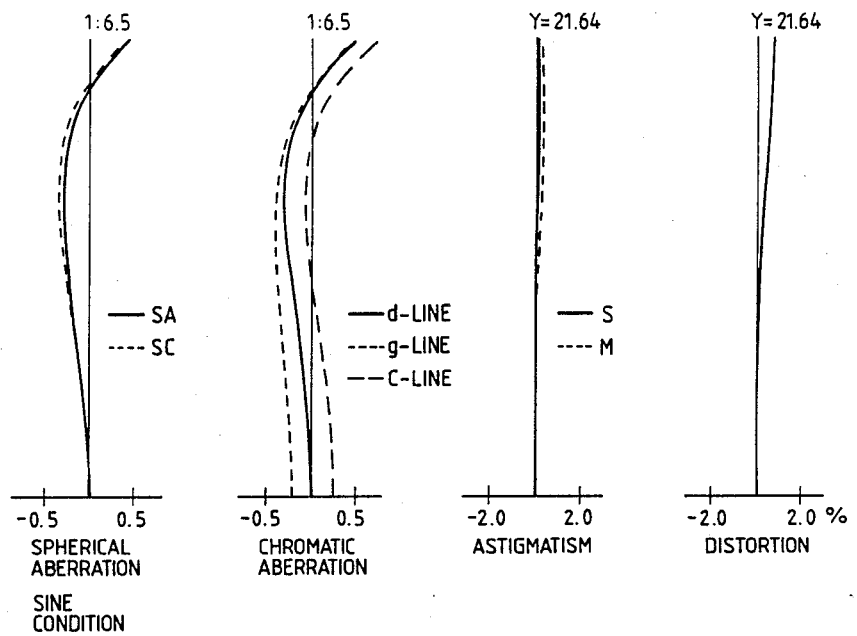
FIG. 24 is a graph plotting the aberration curves obtained when the master lens is moved as specified in Example 4 (Case 3)

Case 3 where macro position is attained by moving the second lens group toward the object, moving lens unit 3a in the same direction but by a smaller amount, and fixing lens unit 3b:

FIG. 24 is a graph plotting the aberration curves obtained in this case at macro magnification (m) of −¼.

Comparative Example 1

Figure 25:
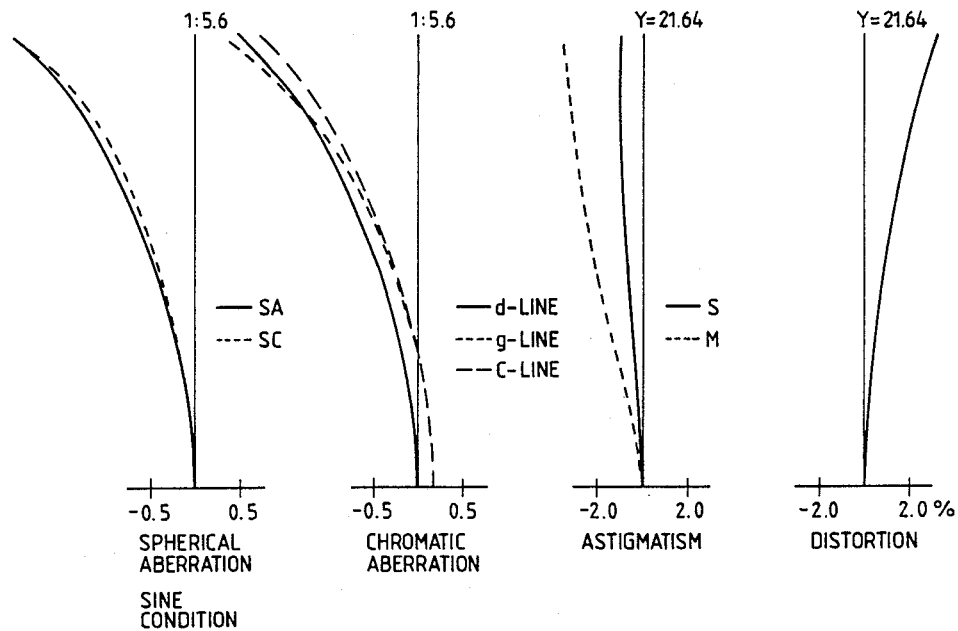
FIG. 25 is a graph plotting the aberration curves obtained when the master lens is moved as specified in Comparative Example 1 (Case 4)

Case 4 where macro position is attained by advancing the first lens group (first lens group extension method):

FIG. 25 is a graph plotting the aberration curves obtained int this case at macro magnification (m) of −¼.

Comparative Example 2

Case 5 where macro position is attained by moving only lens unit 3b toward the image plane:

FIG. 26 is a graph plotting the aberration curves obtained in this case at macro magnification (m) of −¼.

The method of lens moving in the cases depicted in FIGS. 2–9 and the distances between moving lens groups or units are shown in the following tables.

Figure 21:
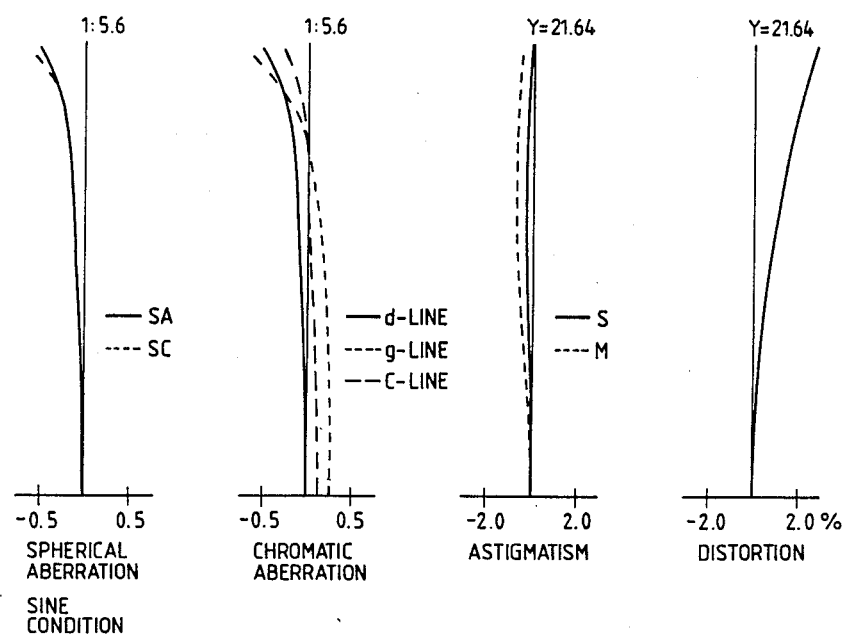
FIG. 21 is a graph plotting the aberration curves obtained with the master lens at the telephoto end, with the focusing distance being adjusted to the closest one a 1.4 m.

| | FIG. 20 | FIG. 21 |
|---|---|---|
| Object-to-lens distance | ∞ | 1.4 m |
| Magnification | 0 | 0.085 |
| $d_5$ | 17.75 | 21.05 |
| $d_{11}$ | 2.50 | 2.50 |
| $d_{22}$ | 9.00 | 9.00 |
| $f_B$ | 56.19 | 56.19 |
| Moving lens groups | | first group |
| Moving ratio | | |

| | FIG. 22 | FIG. 23 | FIG. 24 |
|---|---|---|---|
| Object-to-lens distance | 0.412 m | 0.439 m | 0.418 m |
| Magnification | 0.25 | 0.25 | 0.25 |
| $d_5$ | 15.88 | 14.70 | 9.115 |
| $d_{11}$ | 6.87 | 4.88 | 5.28 |
| $d_{22}$ | 14.17 | 18.53 | 17.35 |
| $f_B$ | 51.02 | 49.84 | 56.19 |
| Moving lens group | second group and unit 3b | second group, and units 3a and 3b | second group and unit 3a |
| Moving ratio | $X_2:X_{3b}$<br>1:−1 | $X_2:X_{3a}:X_{3b}$<br>1:0.5:−1 | $X_2:X_{3a}$<br>1:0.7 |

| | FIG. 25 | FIG. 26 | FIG. 27 |
|---|---|---|---|
| Object-to-lens distance | 0.615 m | 0.522 m | 0.477 m |

-continued

| | | | |
|---|---|---|---|
| Magnification | 0.25 | 0.25 | 0.25 |
| $d_5$ | 27.44 | 21.05 | 10.005 |
| $d_{11}$ | 2.50 | 2.50 | 2.50 |
| $d_{22}$ | 9.00 | 24.32 | 31.09 |
| $f_B$ | 56.19 | 40.87 | 45.14 |
| Moving lens groups | first group extension | unit 3b | second group and units 3a and 3b |
| Moving ratio | | | $X_2:X_{3a}:X_{ab}$ $1:1:-1$ |

In these tables, $X_2$, $X_{3a}$ and $X_{3b}$ denote the amounts of movement of the second lens group and lens units 3a and 3b, respectively, with "minus" sign being prefixed when the movement is toward the image plane.

As described on the foregoing pages, the zoom lens system with which the macro system of the present invention is to be used has coverage of a wide visual field and is capable of attaining a high zoom ratio. It consists basically of a positive first lens group, a negative second lens group, and a positive third lens group which is adapted to be dividable into a positive lens unit 3a and a negative lens unit 3b when zooming from the wide-angle end to the telephoto end, so as to produce a total of four lens groups. For zooming, all lens groups or the first lens group and lens units 3a and 3b in the third lens group are moved toward the object in such a way as to satisfy conditions (A), (B) and (C) set forth herein. What is characteristic of the present invention is that when shooting in the macro range, the first lens group is fixed and the second lens group is moved toward the object, with at least one of lens units 3a and 3b being moved so as to increase simultaneously the distance between the second lens group and lens unit 3a and the distance between lens units $3a_n$ and 3b. Because of this unique lens movement, the zoom lens has the advantage that the lens groups or units need be moved by a reduced amount and the resulting zoom lens system is comparatively simple in mechanical aspects and compact and yet it assures effective compensation for aberrations (in particular, spherical aberration, chromatic aberration and astigmatism) as will be understood from comparison between FIGS. 4-6 and FIGS. 7-9.

I claim:

1. In a compact zoom lens system capable of high zoom ratio and having coverage of a wide visual field which consists, in order from the object side, of a first lens group having a positive focal length, a second lens group having a negative focal length and a third lens group having a positive focal length, and which effects zooming from the wide-angle end to the telephoto end by moving either all of the three lens groups or the first and third lens groups, with the image plane held at a constant position, the improvement wherein the third lens group is composed of a lens unit 3a having a positive focal length and a lens unit 3b having a negative focal length, and the two lens units 3a and 3b are moved independently of each other in such a way that the distance between the lens units 3a and 3b is increased to satisfy the following condition (1) when zooming is effected from the wide-angle end to the middle focal length, and is decreased to satisfy the following condition (2) when zooming is effected from the middle focal length to the telephoto end:

(1) $0.05 < (D_M - D_T)/(f_T - f_M) < 0.6$ $(D_M - D_T > 0)$ (2) $0.35 < (D_M - D_W)/(D_M - D_T) < 5.0$ $(D_M - D_T, D_M - D_W > 0)$ where $D_M$: the distance between lens units 3a and 3b at the middle focal length which corresponds to $K = 0.6-0.9$ of the range of focal lengths;

$D_T$: the distance between lens units 3a and 3b at the telephoto end;

$f_T$: the focal length of the overall system at the telephoto end;

$f_M$: the focal length of the overall system at the middle focal length ($K = 0.6-0.9$); the distance between lens units 3a and 3b at the wide-angle end;

$K$: $(\log f_M - \log f_W)/(\log f_T - \log f_W) = \log Z_M/\log Z$;

$f_W$: the focal length of the overall system at the wide-angle end;

$Z_M = f_m/f_W$: zoom ration for the middle focal length ($k = 0.6-0.9$); and $Z = f_T/f_W$: zoom ratio.

2. A zoom lens system according to claim 1 wherein the lens unit 3b is composed of at least one negative lens element and at least one positive lens element, and satisfies the following condition:

(3) $0.05 < f_W/|f_{3b}| - 0.6 (f_{3b} < 0)$ where $f_{3b}$: the focal length of lens unit 3b.

3. A zoom lens system according to claim 2 wherein the negative lens element in lens unit 3b satisfies the following condition:

(4) $1.7 < N_{3bn}$ where $N_{3bn}$ is the average refractive index of said negative lens element at the d-line.

4. A zoom lens system according to claim 1 wherein the power distribution among the first lens group, the second lens group and lens unit 3a in the third lens group satisfies the following conditions:

(5) $0.35 < f_W/f_1 < 0.85$ (6) $-1.5 < f_W/f_{1-2} < -0.9$

(17) $1.05 < f_W/f_{1-3a} < 1.7$ where $f_1$: the focal length of the first lens group;

$f_{1-2}$: the composite focal length of the first and second lens groups at the wide-angle end; and $f_{1-3a}$: the composite focal length of the first lens group, the second lens group and lens unit 3a in the third lens group at the wide-angle end.

5. A zoom lens system according to claim 1 wherein the second lens group is fixed with respect to the image plane.

6. A zoom lens system according to claim 1 wherein the second lens group is composed of at least two negative lens elements and at least one positive lens element and satisfies the following condition:

(8) $1.7 < N_{2n}$ where $N_{2n}$: the average refractive index at the d-line of the negative lens elements in the second lens group.

7. In a macro system for use with a zoom lens system that has coverage of a wide visual field and which is capable of achieving high zoom ratio, said zoom lens system comprising, in order from the object side, a first lens group having a positive focal length, a second lens group having a negative focal length and a third lens group having a positive focal length, and when zooming is effected from the wide-angle end to the telephoto end, with the distance between the first and second lens groups being increased and the distance between the second and third lens groups decreased, by moving all of the first, second and third lens groups or the first and third lens groups toward the object, the third lens group being divided into a lens unit 3a having a positive focal length and a lens unit 3b having a negative focal length, thereby increasing the total number of lens groups to four, said units 3a and 3b being adapted to be movable independently of each other in such a way that their distance is increased when zooming from the wide-angle end to the middle angle end, and decreased when zooming from the middle focal length to the telephoto end, the improvement wherein ordinary focusing is performed by moving the first lens group, and if close-up shooting is necessary, the first lens group is fixed at the telephoto end, and the second lens group is moved toward the object while one or both of lens units 3a and 3b in the third lens group are moved so as to increase simultaneously the distance between the second lens group and lens unit 3a and the distance between lens units 3a and 3b.

8. A macro system according to claim 7 wherein for close-up shooting, the second lens group is moved toward the object, lens unit 3a is fixed, and lens unit 3b is moved toward the image plane.

9. A macro system according to claim 7 wherein for close-up shooting, the second lens group is moved toward the object, lens unit 3a is moved in the same direction but by a smaller amount than the second lens group, and lens unit 3b is moved toward the image plane away from the second lens group and lens unit 3a.

10. A micro system according to claim 7 wherein for close-up shooting, the second lens group is moved toward the object, lens unit 3a is moved in the same direction but by a smaller amount than the second lens group, and lens unit 3b is fixed.

11. In a compact zoom lens system capable of high zoom ratio and having coverage of a wide visual field which comprises, in order from the object side, a first lens group having a positive focal length, a second lens group having a negative focal length, a third lens group and a fourth lens group, and which effects zooming from the wide-angle end to the telephoto end by moving either all of the three lens groups or the first and third lens groups, with the image plane held at a constant position, the improvement wherein the third lens group 3a has a positive focal length and the fourth lens group 3b has a negative focal length, and the third and fourth lens groups 3a and 3b are moved independently of each other in such a way that the distance between the lens groups 3a and 3b is increased to satisfy the following condition (1) when zooming is effected from the wide-angle end to the middle focal length, and is decreased to satisfy the following condition (2) when zooming is effected from the middle focal length to the telephoto end:

(1) $0.05 < (D_M - D_T)/(f_T - f_M) < 0.6 (D_M - D_T > 0)$ (2) $0.35 < (D_M - D_W)/(D_M - D_T) < 5.0 (D_M - D_T, D_M - D_W > 0)$

Where $D_M$ the distance between lens groups 3a and 3b at the middle focal length which corresponds to $K = 0.6 - 0.9$ of the range of focal lengths;

$D_T$: the distance between lens groups 3a and 3b at the telephoto end;

$f_T$: the focal length of the overall system at the telephoto end;

$f_M$: the focal length of the overall system at the middle focal length ($K = 0.6 - 0.9$);

$D_W$: the distance between lens groups 3a and 3b at the wide-angle end;

$K$: $(\log f_M - \log f_W)/(\log f_T - \log f_W) = \log Z_M/\log Z$;

$f_W$: the focal length of the overall system at the wide-angle end;

$Z_M = f_M/f_w$: zoom ratio for the middle focal length ($K = 0.6 - 0.9$); and $Z = f_T/f_W$: zoom ratio.

* * * * *

UNITED STATES PATENT AND TRADEMARK OFFICE
CERTIFICATE OF CORRECTION

PATENT NO. : 4,917,482

DATED : April 17, 1990

INVENTOR(S) : Takayuki Ito

It is certified that error appears in the above-identified patent and that said Letters Patent is hereby corrected as shown below:

Column 7, line 17, delete the entire line and replace with the following:

--Where $f_M = f_W^{1-K} f_T^{K} (0 < K < 1)$.--

Signed and Sealed this

Fourth Day of February, 1992

Attest:

HARRY F. MANBECK, JR.

Attesting Officer

Commissioner of Patents and Trademarks